United States Patent
Nishimura et al.

(10) Patent No.: US 7,075,455 B2
(45) Date of Patent: Jul. 11, 2006

(54) WIRELESS COMMUNICATION APPARATUS AND METHOD

(75) Inventors: Naoki Nishimura, Tokyo (JP); Kenji Saitoh, Tochigi (JP); Masaaki Imaizumi, Tokyo (JP); Masaaki Shibata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 462 days.

(21) Appl. No.: 10/601,748

(22) Filed: Jun. 23, 2003

(65) Prior Publication Data

US 2004/0005889 A1    Jan. 8, 2004

(30) Foreign Application Priority Data

Jun. 28, 2002  (JP)  ............................. 2002-190551
Oct. 9, 2002   (JP)  ............................. 2002-296595

(51) Int. Cl.
G08C 17/00 (2006.01)
G08C 19/12 (2006.01)
G08B 21/00 (2006.01)
H04B 5/00 (2006.01)
H04Q 7/20 (2006.01)

(52) U.S. Cl. .............................. 340/870.28; 340/539.1; 340/602; 455/41.1; 455/423

(58) Field of Classification Search ........... 340/870.28, 340/602; 455/423, 41.1; 359/591
See application file for complete search history.

(56) References Cited

U.S. PATENT DOCUMENTS 5,963,146 A * 10/1999 Johnson et al. ........ 340/870.01
6,208,247 B1 * 3/2001 Agre et al. ............ 340/539.19
6,358,202 B1    3/2002 Arent
6,373,399 B1 * 4/2002 Johnson et al. ........ 340/870.11
2002/0060631 A1 * 5/2002 Runge et al. ............... 340/602
2002/0068358 A1 * 6/2002 Campbell et al. ........ 435/289.1
2002/0072784 A1    6/2002 Sheppard, Jr. et al.
2003/0063585 A1 * 4/2003 Younis et al. ............... 370/331

FOREIGN PATENT DOCUMENTS

WO    WO 99/17477 A2    4/1999
WO    WO 99/66172 A1   12/1999
WO    WO 01/43823 A1    6/2001

OTHER PUBLICATIONS

Wireless Integrated Microsensors K. Bult, A. Burstein, D. Chang, M. Dong, W.J. Kaiser, et al. (Proceeding of Conference on Sensors and Systems (Sensors Expo), Anaheim, CA. USA, Apr. 16-18, 1996, pp. 33-38).

* cited by examiner

*Primary Examiner*—Jeffery Hofsass
*Assistant Examiner*—Sisay Yacob
(74) *Attorney, Agent, or Firm*—Cowan, Liebowitz & Latman, P.C.

(57) ABSTRACT

A wireless communication apparatus and method is provided which makes discrete functional elements perform a cooperative work without various limitations caused by a wired configuration. The wireless communication apparatus has a plurality of fine functional elements 3 each having a communication unit for data transmission and reception by using radio waves or light and one or more unit other than the communication unit, and a base station 4 for controlling and collectively managing the fine functional elements through communications with the fine functional elements, wherein one or more units other than the communication unit are activated through communications of one of the fine functional elements 3 received control information from the base station 4 with another of the fine functional elements 3 via the communication units, to thereby make the discrete functional elements 3 perform a cooperative work.

4 Claims, 33 Drawing Sheets

WIRELESS COMMUNICATION APPARATUS AND METHOD

BACKGROUND OF THE INVENTION

1. Field of the Invention

The present invention relates to a wireless communication apparatus and method and a driving method for the wireless communication apparatus. More particularly, the present invention relates to a wireless communication apparatus having fine functional elements for communication by utilizing radio waves or light, and to a wireless communication method.

2. Description of the Related Art

Wireless communications utilizing radio frequency (RF) waves or light are recently prevailing. For example, a portable phone is a requisite wireless mobile communication tool capable of communications at any time and at any location using electromagnetic waves of a 900 to 1900 MHz band for example. Wireless communications utilizing radio frequency waves in the 2.45 GHz band are used as a communication means between personal computers or between a personal computer and a printer, in offices or homes, based upon the specifications of wireless LAN (IEEE 802.11.b, a) or Bluetooth.

Although wireless communications are essential for daily life, the application range of wireless communications is limitative. For example, peer to peer communications are performed between a base station and each of a plurality of portable telephones or portable digital assistants (PDA) or between telephones or digital assistants. Although each of a plurality of portable telephones or portable digital assistants (PDA) provides an individual function, a collective function in a group of telephones or assistants is not provided.

For example, in a pixel sensor, each pixel provides an imaging function, and information obtained at each pixel is collectively processed to form a whole image. A control signal for each pixel is transferred from a control circuit via a wiring line (electrical wiring line). Similarly, in a display such as a liquid crystal display, each pixel provides a pixel display function, and information obtained at each pixel is collectively processed via electrical wiring lines to form a whole image. More specifically, two drive circuits and respective functional elements are interconnected in a matrix shape by electrical wiring lines. These wiring lines pose a significant problem when one object is imaged at different angles or a display for a portable apparatus is used which is thin as a piece of paper and is used by being curved or bent.

SUMMARY OF THE INVENTION

The present invention has been made to solve such problems. It is an object of the invention to provide a wireless communication apparatus capable of making discrete functional elements perform a cooperative work without various limitations to be caused by a wired configuration, and a wireless communication method and a driving method for the wireless communication apparatus.

A wireless communication apparatus of the invention comprises: a plurality of fine functional elements each having communication means for data transmission and reception by using radio waves or light and one or more means other than the communication means; and a base station for controlling and collectively managing the fine functional elements through communications with the fine functional elements, wherein one or more means other than the communication means are activated through communications of one of the fine functional elements received control information from the base station with another of the fine functional elements via the communication means.

A wireless communication apparatus of the invention comprises: a functional element group including a plurality of functional elements each having a first function for performing wireless communication by using light or radio waves and a second function different from the wireless communication, wherein the second function of each of the functional elements is a single function, and the functional element group provides as a whole one or more of the second function through a cooperative work of each of the functional elements using the first function.

A wireless communication method of the invention for a wireless communication apparatus, the apparatus comprises: a plurality of fine functional elements each having communication means for data transmission and reception by using radio waves or light and one or more means other than the communication means; and a base station for controlling and collectively managing the fine functional elements through communications with the fine functional elements, wherein one or more means other than the communication means are activated through communications of one of the fine functional elements received control information from the base station with another of the fine functional elements via the communication means.

According to the invention made by the present inventors, a network is configured by using fine functional elements distributed to different positions and having each a wireless communication function and a special function such as a sensing function and a base station for controlling the fine functional elements. Application of wireless communication technologies can be broadened. It is possible to provide a system for collectively managing a sensing operation at a plurality of different positions by using wearable apparatus or a sensing network.

Conventional functional elements such as imaging, displaying and recording functional elements have been disposed in a matrix shape by metal wiring lines. According to the invention, each functional element is provided with a wireless communication function to remove a wired configuration. With the collective managing system for sensing operations and the removal of a wired configuration, the object of the invention can be achieved.

The fine functional element of the invention becomes significant if three points are satisfied: the element should be fine; the element should have a communication function; and a plurality of fine functional elements as a whole provide one or more functions. A cost of a commercial product is important. The fine functional element of the invention is formed on a single substrate so that the cost per fine functional element can be reduced and the size thereof can be made small.

DETAILED DESCRIPTION OF THE PREFERRED EMBODIMENTS

Embodiments of a wireless communication apparatus according to the invention will be described with reference to the accompanying drawings.

First Embodiment

Figure 1:
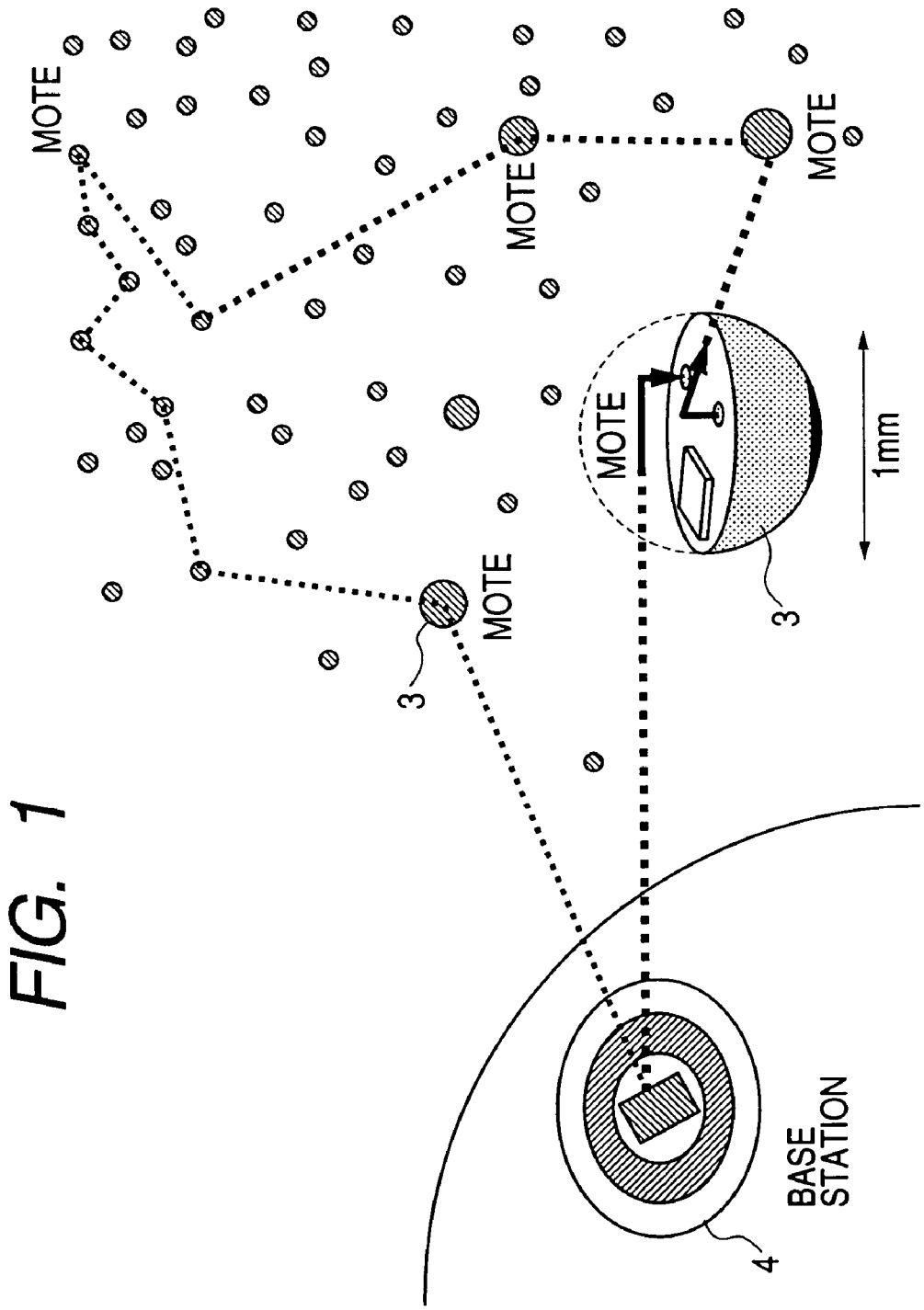
FIG. 1 is a conceptual diagram showing a wireless communication system according to an embodiment of the invention.

FIG. 1 is a conceptual diagram showing a wireless communication system according the invention. A number of fine micro functional elements (Motes) 3 each having a communication function are distributed here and there like stars in the cosmic Galaxy. Each Mote 3 has a wireless communication function using light or RF waves and communicates with a base station 4.

In the example shown in FIG. 1, the base station 4 communicates with Mote 3 near to the base station. This Mote 3 communicates with another Mote 3 near to the Mote 3. In this manner, communications are possible between each Mote 3 and base station 4. As shown in FIG. 1, each Mote 3 has a small outer shape, for example, a sphere having a diameter of 1 mm. Motes 3 and base station 4 constitute a wireless communication network. Each Mote 3 has, for example, a sensing function and is constitutes a sensing network.

Each Mote 3 has a sensing function for observing the environment of Mote 3, such as light, temperature, humidity, sound, position, velocity, magnetic field and electric field. Mote 3 sends such information to the base station 4 which has a function of analyzing the information. The base station 4 has an integrated managing function for supplying each Mote with information on when and how the sensing function is activated with what procedure, to realize one or more main functions in a group of all Motes 3.

It is possible to know the position dependency and time sequential change of the information such as light, temperature, humidity, sound, position, velocity, magnetic field and electric field. For example, Motes 3 are disposed here and there in a room to monitor the temperature and humidity in the room, and the base station 4 is disposed in an air conditioner. It is therefore possible to blow warm air or cool air to make uniform the temperature/humidity distribution in the room. If Mote 3 is provided with a sensing function of sensing the position of a person, warm or cool air can be concentratedly blown to the area where the person is positioned, so that a predetermined area can be set to a desired temperature with a priority over other areas and energy can be used efficiently. The embodiment is applicable to not only the room in which a person is present, but also other apparatus requiring a temperature/humidity management.

Other possible applications are the management of temperature, humidity, electric field, magnetic field and the like of commercial products such as personal computers, copy machines, and laser or ink jet printers. For example, the invention is applicable to a sensing function of sensing the inside of a copy machine, e.g., a temperature management of a heat generating member during a transfer process, a jammed paper detection of a paper feed function, and a tank remainder detection of ink or toner of an ink jet printer or a copy machine.

If Mote 3 is provided with an imaging function and Motes are distributed here and there, a three-dimensional image can be took and collectively managed by the base station 4, facilitating image processing.

If Mote 3 is provided with a function of measuring blood pressure and body temperature and Motes with an adhesive tape are distributed here and there of a human body, a base station reduced in size to the palm of a hand is put in pocket or the like to allow the human body to be monitored and any abnormality of the inside of the human body can be detected at once. If a number of points such as arm, chest, back, waist, and foot are monitored with Motes 3, total information of a human body can be collectively managed and the health state of the human body can be more correctly checked than monitoring only one point of the human body. It is known that current flows in a nerve cell of a human brain because of ion motion of sodium, potassium and the like and a magnetic field is generated. By attaching Motes 3 for detecting this magnetic field to the surface of the brain, a change in the position and time of the activation state in the inside of the brain can be measured. Medical applications are possible such as a responsibility upon external stimulus.

Each Mote 3 is formed on its own substrate so that it can be disposed singularly at any desired position. Motes 3 are disposed spaced apart by a distance corresponding to the sizes of the substrates. This distance may be a distance capable of communications. If Motes 3 are disposed spaced by a distance of 100 m or 1 km, a large communication power is consumed and the size of an antenna necessary for communications becomes large and Mote 3 becomes large correspondingly. Therefore, the distance between Motes 3 and the base station 4 is preferably 10 m or shorter, more preferably 5 m, or most preferably 1 m or shorter.

In order to distribute Motes 3 for monitoring the environment with a sensing function, it is preferable that the size of Mote is 10 mm or smaller. If the size is 1 mm or smaller, various functions can be provided at the best. The number of Motes 3 is preferably 5, more preferably 10, or most preferably 50 or larger.

It is preferable and one of important features that each Mote 3 has an element for realizing the communication function and an element for realizing one or more functions, respectively formed on a single substrate. As the element for realizing the communication function and the element for realizing one or more functions are formed on the single substrate, various advantages such as compactness and low cost are obtained more than they are formed on different substrates. This point is important for the application to commercial products.

Figure 2:
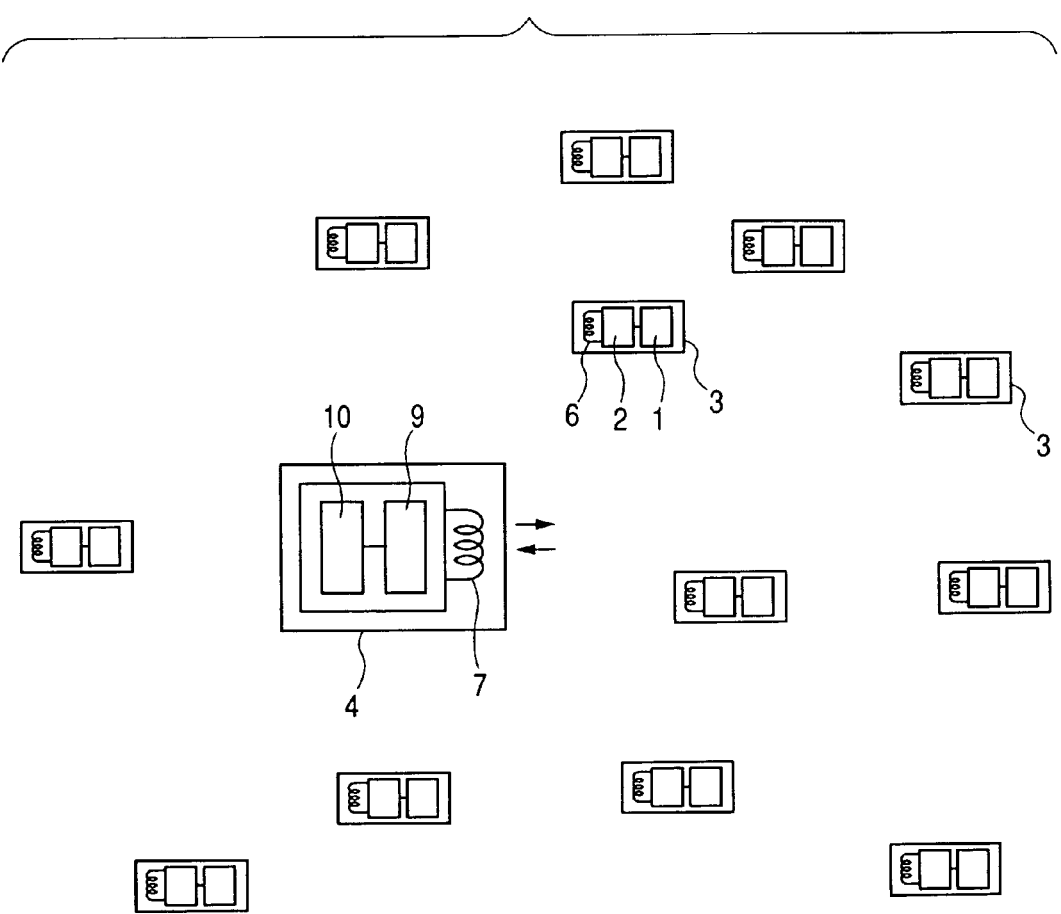
FIG. 2 is a diagram showing the structure of a wireless communication system according to an embodiment of the invention.
Figure 3:
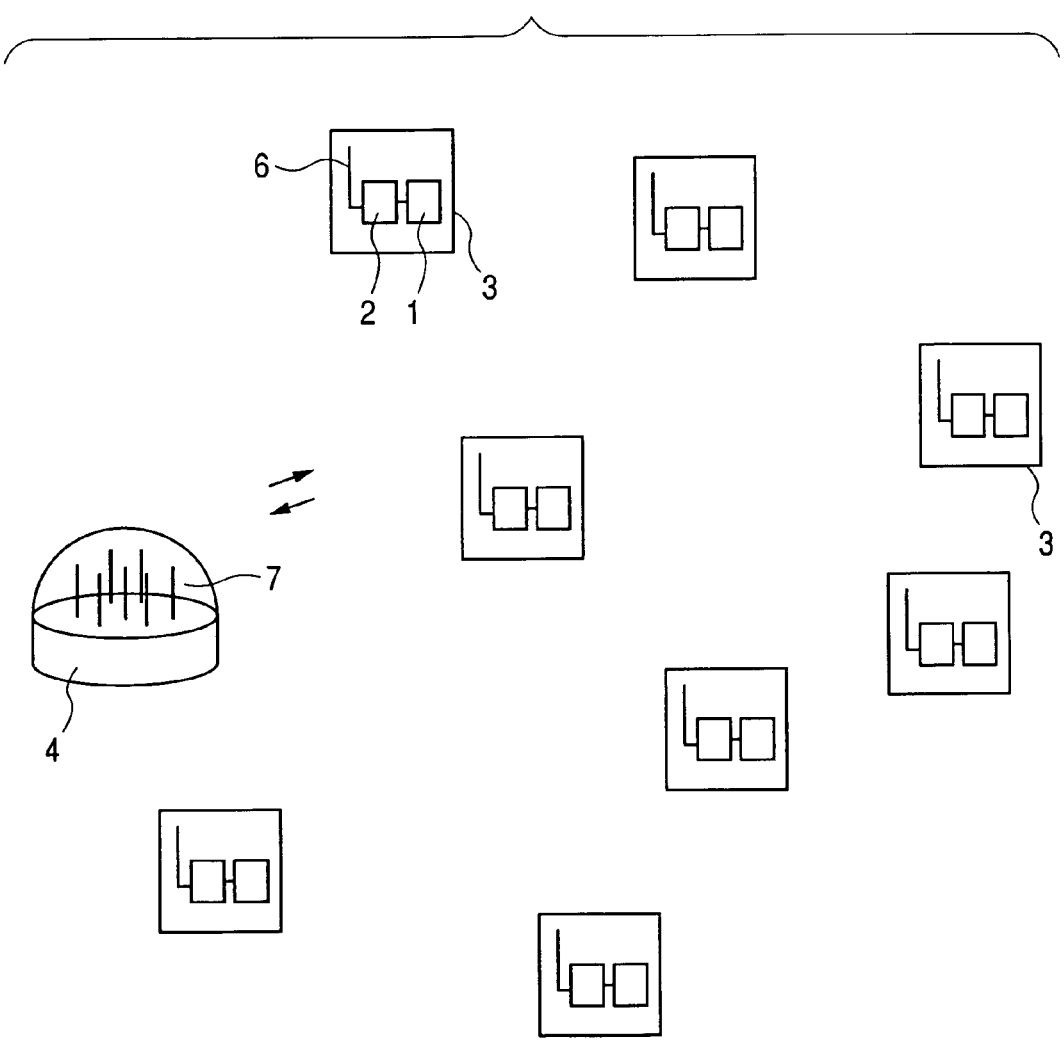
FIG. 3 is a diagram showing the structure of a wireless communication system according to an embodiment of the invention.

FIGS. 2 and 3 illustrate RF wireless communications. Each Mote 3 has an antenna 6, a wireless communication element 2 and a functional element 1, and a base station 4 has an antenna 7, a wireless transceiver 9 and a data processing unit 10. A coil antenna is used in FIG. 2, and a monopole antenna is used in FIG. 3.

Figure 4:
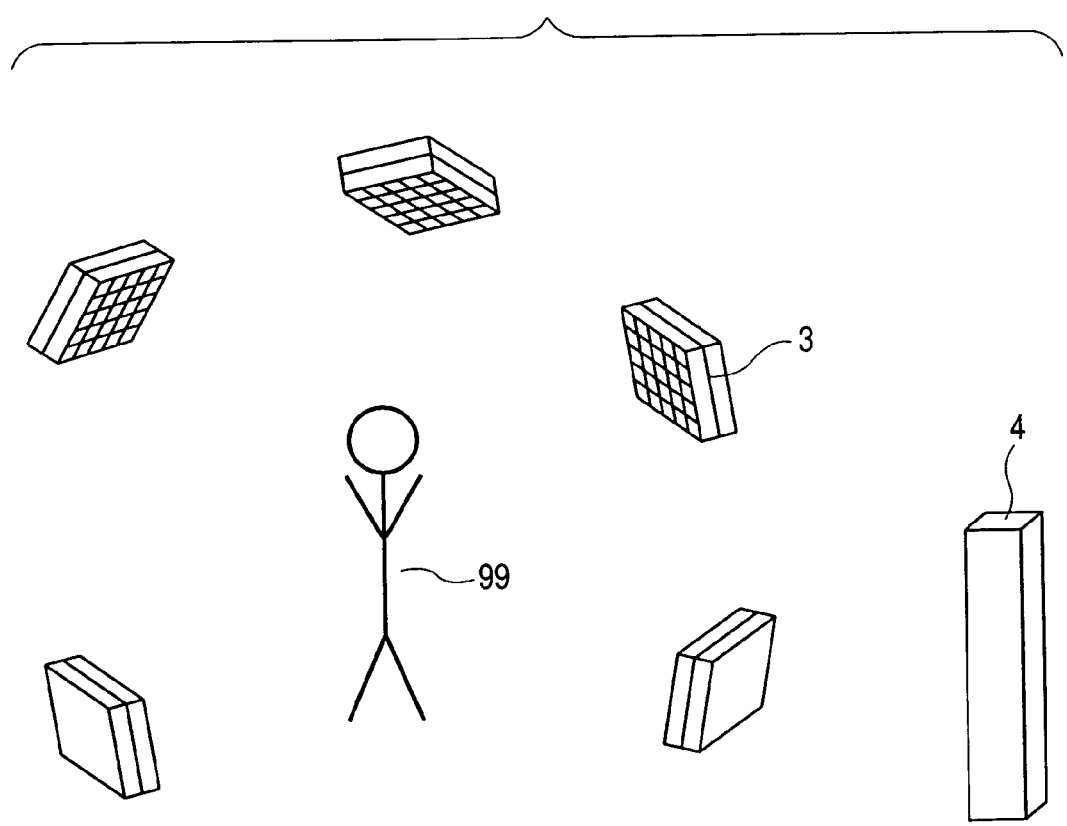
FIG. 4 is a diagram showing the structure of a wireless communication system according to an embodiment of the invention.

FIG. 4 illustrates Motes 3 disposed omnidirectionally relative to an object 99 to monitor the object and transmit information to a base station 4. Various layouts of Motes 3 can achieve various objects. For example, the portrait of a person can be took three-dimensionally to form a cubic image.

Mote 3 is characterized in that it has own power generating function of supplying an energy in order to realize the communication function and other functions of Mote 3, or it utilizes radio frequency or light energy to be used for the communications. Since the energy is externally supplied without using a secondary battery, Mote 3 can always operate without battery replacement.

As a method of generating a power by itself, a solar battery or an element for converting vibration into an electric energy may be used. For example, opposite ends of a comb type electrode are fixed to allow up/down vibration with a capacitance change to convert the vibration energy into electric energy. Wind power generation may be used. A structure having own power generating function and being physically easy to replenish fuel, such as a fuel battery, may be used. Energy of radio frequency or light may be used. For example, high frequency energy of a carrier is converted by a rectifier circuit into a d.c. energy which is stored in a capacitor and used for driving the functional processing circuit. Such energy supply by radio frequency can be performed at the same time when data is transmitted, and is relatively influenced less by the environment conditions such as weather.

Second Embodiment

With reference to the accompanying drawings, description will be made on a wireless communication system with a wireless communication function according to a second embodiment of the invention.

Figure 5:
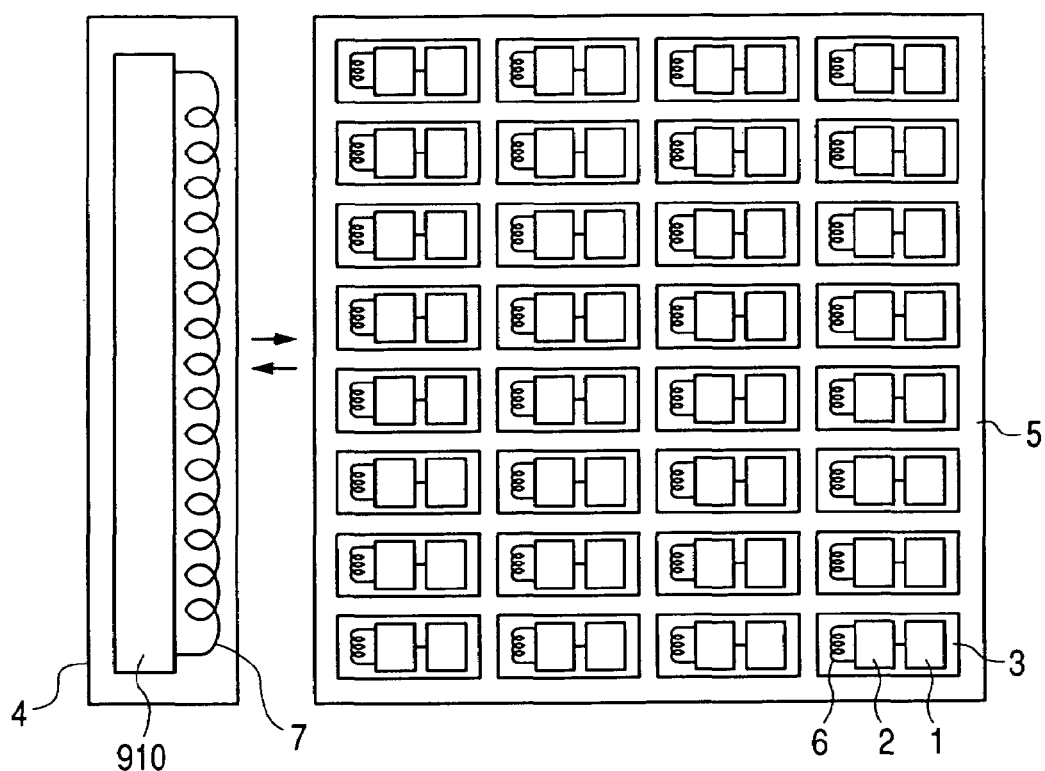
FIG. 5 is a diagram showing the structure of a wireless communication system according to an embodiment of the invention.
Figure 6:
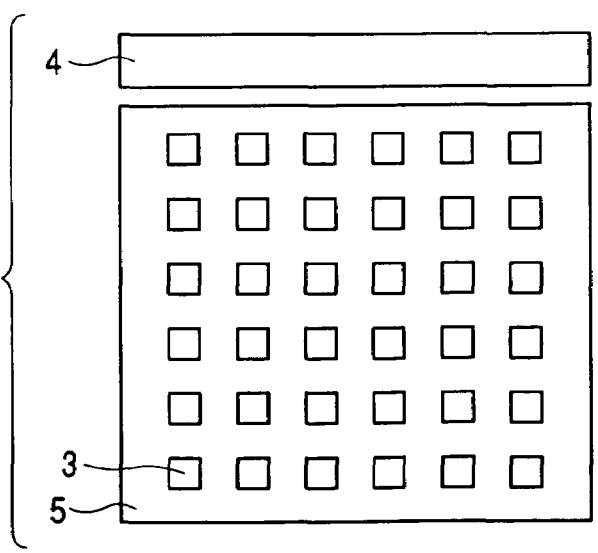
FIG. 6 is a diagram showing the structure of a conventional wireless communication system according to an embodiment of the invention.

FIGS. 5 and 6 show the structure of a wireless communication system according to the second embodiment of the invention. Referring to FIG. 5, Motes 3 are disposed on the same substrate 5 in a matrix shape, each Mote being constituted of a functional element 1, a wireless communication element 2 and an antenna 6. A wireless communication unit 4 is formed on a substrate different from the substrate 5 and placed at a position spatially remote from the substrate 5, the wireless communication unit 4 a being constituted of an antenna 7 and a transmitter circuit 910. The wireless communication unit 4 has the function same as that of the base station 4 of the first embodiment. This system of the second embodiment is called a wireless array.

In this embodiment, electrical wiring lines are not used, but data is transferred over radio frequency waves between each Mote 3 and wireless communication unit 4a.

FIG. 6 is a simplified diagram representing the concept illustrated in FIG. 5. With reference to FIG. 6, the second embodiment will be described by comparing it to conventional systems shown in FIGS. 7 and 8.

Figure 7:
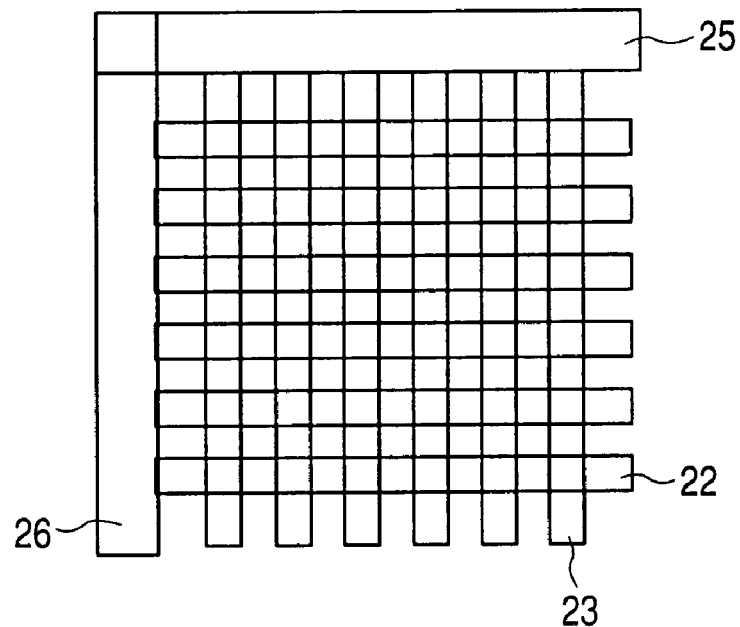
FIG. 7 is a diagram showing the structure of a conventional functional apparatus as a comparison example.

FIG. 7 is a diagram showing a matrix layout conventionally used for displays such as a CCD sensor, a CMOS sensor, a liquid crystal display, a plasma display and an organic EL display and memories such as a DRAM and an EEPROM. A functional element such as an imaging element, a displaying element and a memory element is disposed at each cross point of a matrix constituted of row wiring lines 22 and column wiring lines 23. Selector circuits 25 and 26 are disposed at one ends of the row and column wiring lines 22 and 23 for selecting desired lines.

Figure 8:
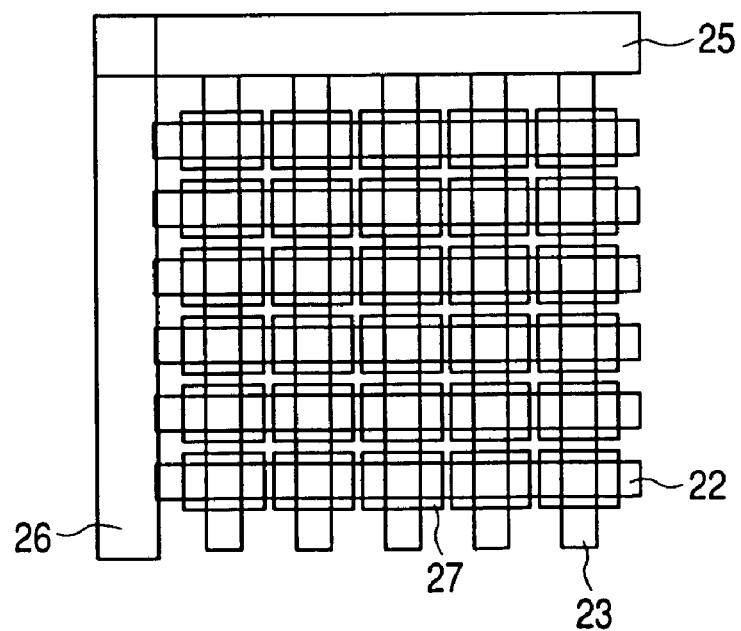
FIG. 8 is a diagram showing the structure of a conventional functional apparatus as a comparison example.

A particular Mote 3 disposed at a matrix cross point is selected from a number of Motes 3 by using ones of the row and column wiring lines 22 and 23. FIG. 7 shows a so-called simple matrix structure without a switching element for each Mote, and FIG. 8 shows a so-called active matrix structure having a switching element 27 at each matrix cross point to suppress crosstalk to be generated when each Mote is selected. Since wiring lines 22 and 23 are used in both the conventional examples shown in FIGS. 7 and 8, it is difficult to curve the substrate, and a wiring delay is generated so that the operation speed becomes lower as the size of the matrix becomes large.

In contrast, in the wireless array shown in FIG. 6, the wireless communication unit as the base station 4 communicates over radio frequency waves with each Mote 3 formed on the substrate 5 to provide the functions such as imaging, displaying and storing. There is therefore the merit that cumbersome wiring works are omitted. It is also possible to provide Mote 3 having a plurality of different functions such as imaging, displaying and storing. For example, by forming imaging elements on a substrate 5 having displaying elements, it is possible to realize a system capable of imaging while an image on the display is observed. This can be applied to a TV phone capable of eye contact. Imaging elements may be attached to a curved plane.

The size of Mote 3 of this embodiment is preferably 1 mm or smaller, more preferably 0.5 mm or smaller, most preferably 10 µm or smaller, when considering that the size of a system having a collection of Motes 3 is easy to be handled and that the imaging, displaying or storing function are made available. Of the Mote 3, an element providing the imaging, displaying or recording function may be made small and an element providing the wireless communication function may be made large to share it with a plurality of functional elements.

By incorporating the wireless array concept of this embodiment, it is possible to form a device on a flexible substrate and realize multifunctional elements.

Third Embodiment

In this embodiment, a procedure for data transmission/reception to be executed by a wireless communication system of the invention will be described with reference to the accompanying drawings.

Figure 9:
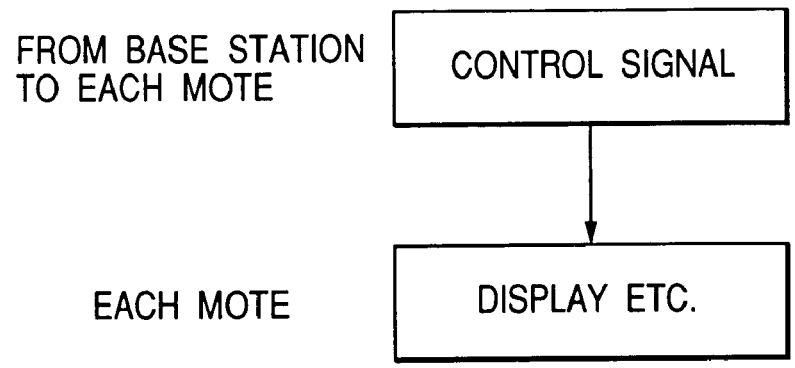
FIG. 9 is a diagram illustrating a communication procedure of a wireless communication system according to an embodiment of the invention.
Figure 10:
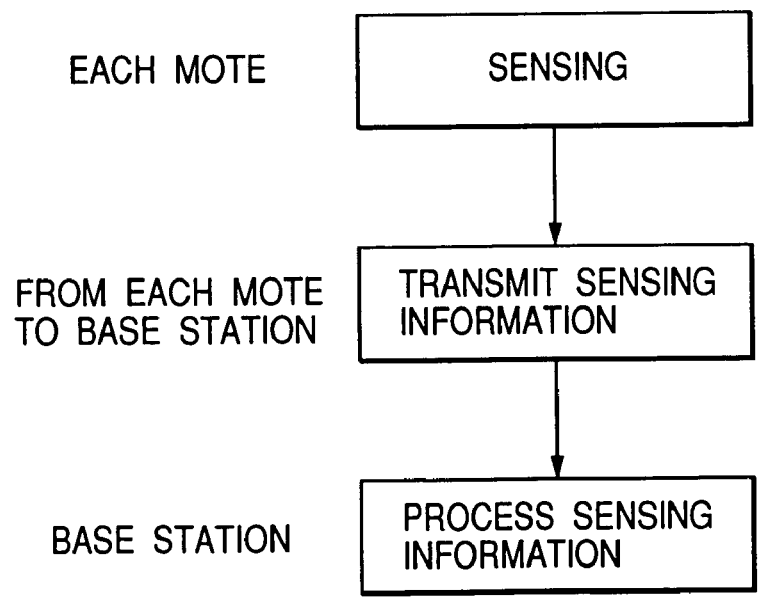
FIG. 10 is a diagram illustrating a communication procedure of a wireless communication system according to an embodiment of the invention.
Figure 11:
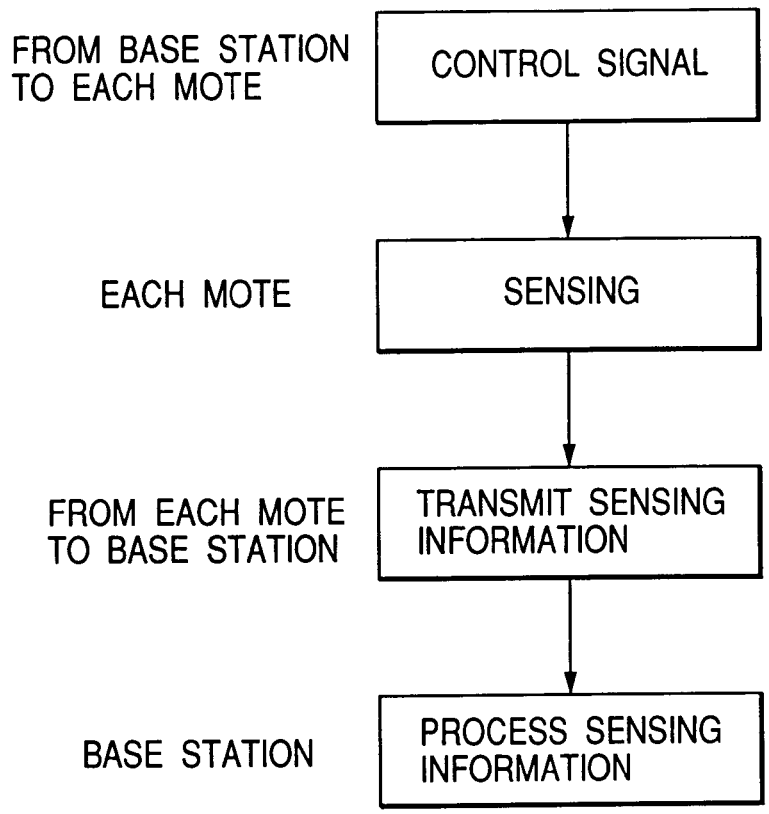
FIG. 11 is a diagram illustrating a communication procedure of a wireless communication system according to an embodiment of the invention.

FIGS. 9 to 11 illustrate a communication procedure between Mote 3 and the base station 4 according to the invention, the communication procedure including three types.

With the first communication procedure, as shown in FIG. 9, after a control signal is supplied from the base station, each Mote 3 provides a function. For example, this procedure is applicable to a display device. Namely, the base station 4 sends a display-on signal to each functional element 1 (in this example, a displaying element) disposed in a matrix shape. An image of text can therefore be displayed on a whole screen. In this case, after the base station 4 sends a control signal to each Mote 3, each Mote 3 provides its function without a necessity of sending a signal from the Mote 3 to the base station 4.

With the second communication procedure, as shown in FIG. 10, each Mote 3 provides a sensing function to transmit sensed information to the base station 4. Since each Mote 3 transmits information to the base station 4 when sensing is completed, a control signal from the base station is not necessary. This procedure is applicable to the case that only after an imaging element senses a specific object, the sensed signal is sent to the base station 4. Although the base station 4 is required to be always able to receive a signal from each Mote 3, a consumption power can be reduced by always flowing a small current (in a standby state), and when a transmission ready signal is received from Mote 3, increasing power to perform a reception operation.

With the third communication procedure, as shown in FIG. 11, first the base station 4 sends a control signal to each Mote 3 and then Mote 3 provides a sensing function or the like in accordance with the timing and type of the control signal, and sends the obtained information to the base station 4. For example, this procedure is applicable to the case that when the base station 4 desires to pick up an image an object, it sends a control signal to Mote 3 which in turn at this timing sends picked-up imaged data to the base station.

Fourth Embodiment

A wireless communication method to be executed by the wireless communication system of the invention will be described with reference to the accompanying drawings. Wireless communication is a so-called radio frequency (RF) communication using electromagnetic waves excepting light.

For the wireless communication, electromagnetic waves in a frequency range of about 1 kHz to 100 GHz are generally used as a carrier. The wireless communication method is roughly classified into a electromagnetic induction type and a micro wave type. The electromagnetic induction type is also called an electromagnetic coupling type if the communication distance is short. In the electromagnetic induction type, mutual conductance of coils in an a.c. magnetic field is used for communication.

Figure 12:
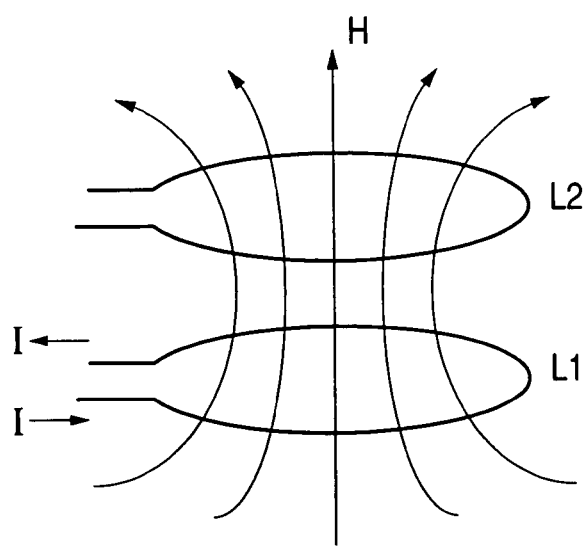
FIG. 12 is a diagram illustrating the principle of a communication method between micro functional element (Mote) and a base station or between Motes.

FIG. 12 is a schematic illustration of an electromagnetic induction type. As current I is flowed through a transmission coil L1 along the direction shown in FIG. 12, a magnetic field H is generated as shown. As an a.c. current is flowed, an electromotive force is generated in a reception coil L2 by electromagnetic induction. With this electromagnetic induction, information transfer and power transmission are possible. Generally, electromagnetic waves in the long to middle band of 250 KHz or lower or 13.56 MHz are often used. The frequencies are not limited only to these.

If the electromagnetic induction type is to be incorporated in the wireless communication system of the invention, two coils are used for each of the antennas of Mote 3 and base station 4. Communication is performed by using a voltage induced by induction magnetic fluxes of the two coils. Assuming that the number of coil turns is N and a magnetic flux generated by one flux loop is φ, then the total magnetic flux is given by the following equation (1). The magnetic flux φ is given by the following equation (2) where B is a magnetic flux density and A is an area of a loop. The magnetic flux density B is given by the following equation (3) where μ is a permeability of a magnetic field space and H is a magnetic field. An induced voltage U2 of the coil L2 is proportional to a time change of the magnetic flux and is given by the following equation (4) which is a product of a mutual inductance M and a current flowed in the coil L1 differentiated by a time t. By increasing the number of coil turns or disposing a magnet having a high permeability in the coil central area, a higher induction voltage is generated so that the communication distance can be elongated.

$$\Psi = N\phi \quad (1)$$

$$\phi = BA \quad (2)$$

$$B = \mu H \quad (3)$$

$$U_2 = (d\Psi_2)/dt = M(dI_1)/(dt) \quad (4)$$

Figure 13:
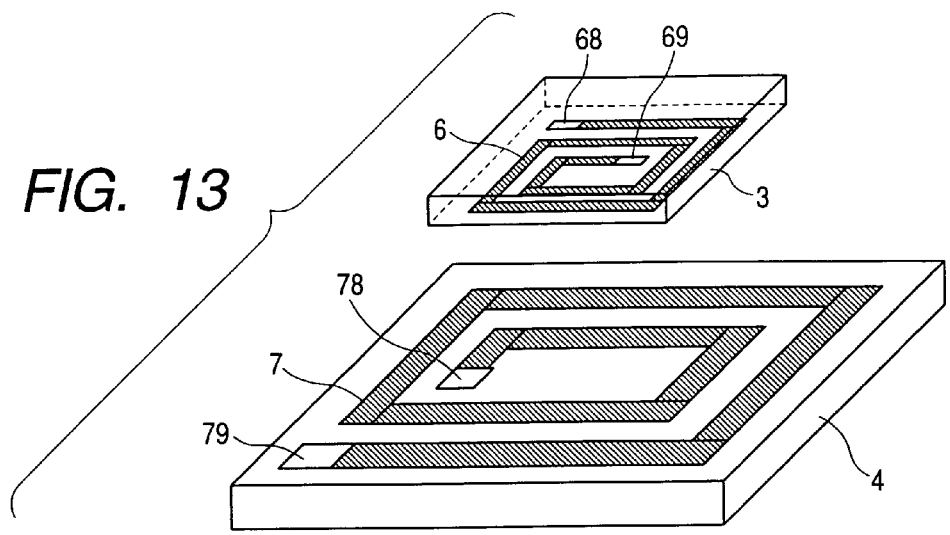
FIG. 13 is a diagram showing the structure of an antenna between Mote and a base station or between Motes.

FIG. 13 shows an example of antennas of the electromagnetic induction type. Mote 3 has a coil antenna 6 whose opposite ends 68 and 69 are connected to an unrepresented communication circuit and functional element. Similarly, the base station 4 has an antenna whose opposite ends 78 and 79 are connected to an unrepresented communication circuit. Although not shown, it is preferable to dispose a soft magnetic member orientated vertically to the loop plane, in a central area of the antenna. If the number of turns is increased, the wiring resistance becomes high and a resistor loss becomes large. It is necessary to suppress the resistor loss within a small resistance range as compared to the total energy loss. If the inductance components of the magnet become too large, it is difficult to drive the antenna at a high frequency. The inductance components are therefore required to be suppressed so as not to lower the data transmission/reception speed.

With the electromagnetic induction type, an a.c. current is flowed through the antenna for transmission and the reception side receives a changing magnetic field generated by the a.c. current. Therefore, if the loop plane is disposed perpendicular to the propagation direction of a magnetic field, i.e., perpendicular to the direction toward the transmitter, the reception sensitivity becomes highest.

With the micro wave type, micro waves in a 2.5 GHz band for example are used for data transmission and reception between Mote 3 and the base station 4. Since a very high frequency in the GHz band is used, the communication is less influenced by external noises and a communication distance can be elongated as far as several m. An antenna unit and an element can be mounted directly on a metal plane to make the communication speed fastest. Since the communication distance is long, electromagnetic waves with alternate magnetic waves and electric waves are spatially transmitted to the reception side. Two types of communication means are therefore possible, one magnetic field reception and the other electric field reception.

Figure 14:
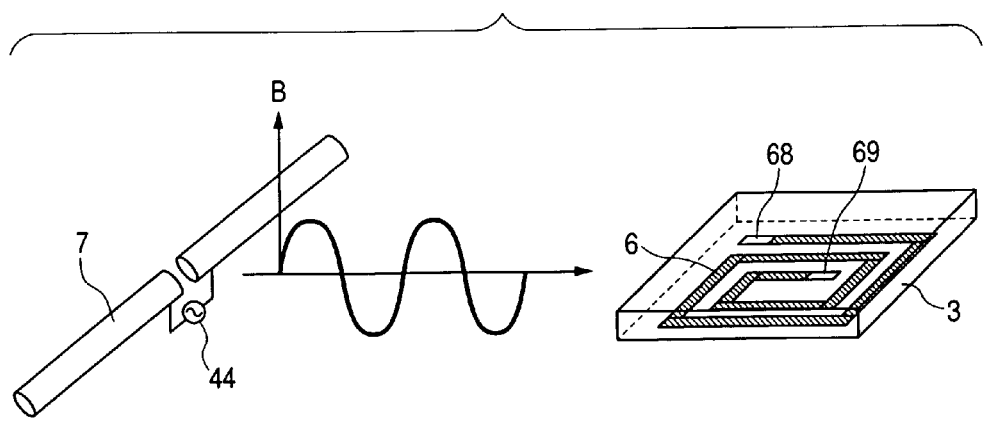
FIG. 14 is a diagram illustrating communications between Mote and a base station or between Motes.

FIG. 14 shows an example of magnetic field reception. A dipole antenna 7 is used as the transceiver antenna of the base station 4. As an a.c. current 44 is flowed through the dipole antenna 7, a magnetic field B is generated along a direction perpendicular to the dipole antenna 7. The coil antenna 6 of Mote 3 is disposed so that the magnetic field B traverses the coil loop plane to generate an electromotive force. By connecting an unrepresented reception circuit and functional element to opposite ends 68 and 69 of the coil antenna 6, Mote 3 can provide its function. The number of coil turns is preferably increased to raise the reception efficiency. If the number of coil turns is increased too many, the resistor loss increases. The number of coil turns is therefore set in such a manner that a proper resistance value is obtained matching the coil cross section. A voltage to be generated increases as the reception area is broadened. Therefore the reception area is preferably broadened to the degree that system miniaturization is not hindered.

Figure 15:
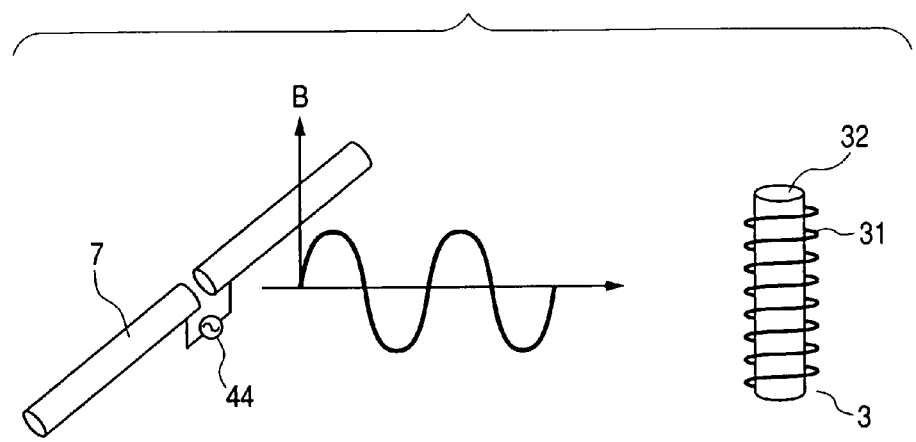
FIG. 15 is a diagram illustrating communications between Mote and a base station or between Motes.

As shown in FIG. 15, in order to increase the magnetic flux density, it is effective to dispose a magnetic material 32 having a high permeability in the central area of the coil 31. A bar antenna with a wound coil may be used.

In both cases, the highest reception sensitivity can be obtained if the loop plane is disposed in parallel to the electromagnetic wave propagation direction, i.e., the direction toward the transmitter.

Figure 16:
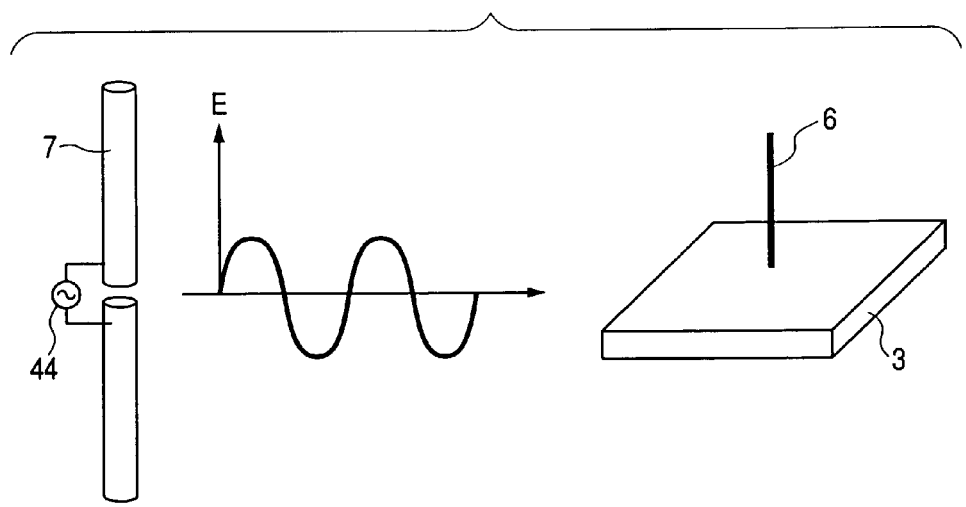
FIG. 16 is a diagram illustrating communications between Mote and a base station or between Motes.

FIG. 16 shows an example of electric field reception. A dipole antenna is also used as the transmission antenna. Waves of an electric field E are received. Waves of an electric field E are also generated in the case of FIGS. 14 and 15, and waves of a magnetic field M similar to FIGS. 14 and 15 are generated in the case of FIG. 16. For the purposes of simplicity, these waves are not drawn in these Figures. The intensity change in the electric field E is in parallel to the dipole antenna. The highest reception sensitivity can be obtained when the reception antenna 6 is directed along the same direction as that of the transmission antenna. In FIG.

16, a monopole antenna is shown as the reception antenna. By grounding one end of the antenna, the mirror effect occurs so that an antenna having the same length in electrical sense exists on the opposite side of the ground plane. This antenna therefore functions as the dipole antenna. Although Mote 3 on the receiving side may use a dipole antenna, it is preferable to use a monopole antenna if the antenna can be grounded sufficient, because the length of the antenna can be shortened.

If a magnetic field is received or electromagnetic waves are supplied, a length of $\lambda/2$ for the dipole antenna and a length of $\lambda/4$ for the monopole antenna with its one end grounded are preferable because the maximum gain can be obtained. This lengths are illustrative and not limitative.

Although the 2.5 GHz band is used as the frequency band for the micro wave type, the frequency band is not limited only to the 2.5 GHz band or other GHz bands, but other bands may also be used if the above-described mechanism can be realized for transmission and reception of electric and magnetic fields of an electromagnetic wave. The wavelength $\lambda$ of an electromagnetic wave is 22.1 m at 13.56 MHz, 33.3 cm at 900 MHz, 12.2 cm at 2.45 MHz, 6.0 cm at 5 GH, 3.0 cm at 10 GHz, 1.0 cm at 30 GHz, and 3.0 mm at 100 GHz. If the microwave type is applied to Mote 3, the GHz band is preferable because the higher the frequency, the shorter the antenna.

At a frequency over 60 GHz, a standard Si transistor is hard to be used in a transmitter circuit, and a high electron mobility transistor (HEMT) becomes necessary, resulting in a high cost. It is therefore preferable to use electromagnetic waves at a frequency of 60 GHz or lower. With present high frequency technologies, a transmitter circuit becomes complicated at 30 GHz or higher, i.e., in a so-called millimeter wave frequency band. It is therefore more preferable to use electromagnetic waves at a frequency of 30 GHz or lower. These limitations are not essential principles for the present invention, because there is a possibility that a frequency in several tens GHz band can be used after future technical developments.

The above description assumes that the space for transmission and reception of electromagnetic waves with an antenna has a dielectric constant of 1. If the dielectric constant of a substance near at the antenna is made larger than 1, the effective wavelength can be made shorter so that the necessary length of the antenna can be shortened. It is to be noted, however, that if the extinction coefficient (absorption) becomes large, a loss becomes large.

In principle, since the reception antenna can be used also as a transmission antenna, the relation between transmission and reception shown in FIGS. 14 to 16 may be reversed. However, when the transmission power efficiency is taken into consideration, a dipole or a monopole antenna is preferably used as the antenna of the base station 4 if the transmission distance is 10 cm or longer. The electromagnetic induction type is preferably used if the communication distance is shorter than 10 cm or among other things several mm or shorter.

In order to reduce the size of the antenna of Mote 3, it is preferable to use a coil antenna such as shown in FIGS. 14 and 15, or alternatively to use a dipole or monopole antenna at a transmission frequency of 10 GHz or higher, or more preferably at 20 GHz or higher. The shape of the antenna is not limited only to those described above, but other shapes may be used such as modifications of a dipole antenna, including an inverted L-character antenna, a slit antenna and a helical antenna. A dielectric antenna used with a Bluetooth apparatus is 1 cm square and has a communication distance of about 1 m. This dielectric antenna is effectively used as the antenna of Mote 3 of the invention.

According to antenna engineering, by representing the wavelength of an electromagnetic wave as $\lambda$, in a near field region at the communication distance shorter than $\lambda/\pi$, the electromagnetic induction type becomes dominant, and in a far field region at the communication distance of $\lambda/(2\pi)$ or longer, the micro wave type becomes dominant. The communication distance is one measure of determining whether the electromagnetic induction type or micro wave type is adopted.

Next, with reference to FIGS. 17 to 23, the circuits of Mote 3 and the base station 4 will be described.

Figure 17:
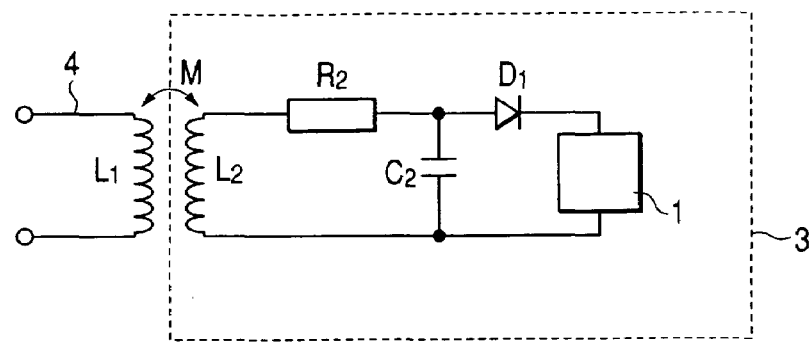
FIG. 17 is a circuit diagram between Mote and a base station or between Motes.

FIG. 17 is a circuit diagram illustrating the electromagnetic induction type. An antenna L1 of the base station 4 transmits a signal supplied from an unrepresented control circuit toward an antenna coil L2 of Mote 3. The antenna coils L1 and L2 are coupled by a mutual inductance M so that information from the base station 4 is transferred via the space to Mote 3. In Mote 3, the inductance of the antenna coil L2 and the capacitance C2 connected parallel constitutes a resonance circuit to thereby receive a signal having a specific frequency from the base station 4. R2 represents a resistance of the antenna L2. The resonance frequency fc can be given by the following equation (5) by using the inductance L and capacitance C.

$$fc=1/(2n\sqrt{LC}) \quad (5)$$

If it is set so that each Mote 3 has a different resonance frequency, a control signal can be transmitted from the base station 4 to a specific Remote 3. For example, L=1 nH and C=1.4×10$^{-7}$F at a transmission frequency of 13.56 MHz, and L=1 nH and C=4.2×10$^{-12}$F at a transmission frequency of 2.45 GHz.

A high frequency current at a selected single frequency is rectified by a diode D1 and applied to a functional element 1. For example, for a display device, the base station 4 as the wireless communication unit sends a radio wave at the resonance frequency to the element which displays an image. A whole image can therefore be formed as desired.

Figure 18:
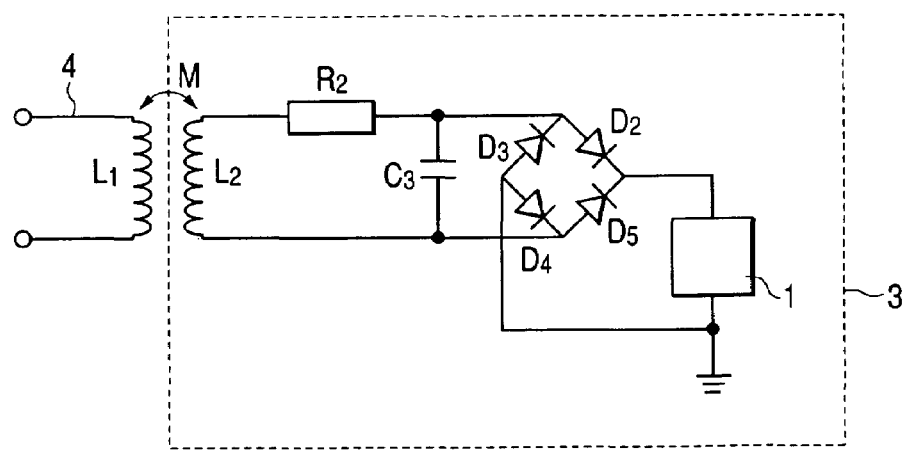
FIG. 18 is a circuit diagram between Mote and a base station or between Motes.

FIG. 18 is a rectifier circuit made of diodes D2 to D4 replaced with the diode D1 shown in FIG. 17. This rectifier circuit is used when a more linear signal is to be applied to the functional element 1.

Figure 19:
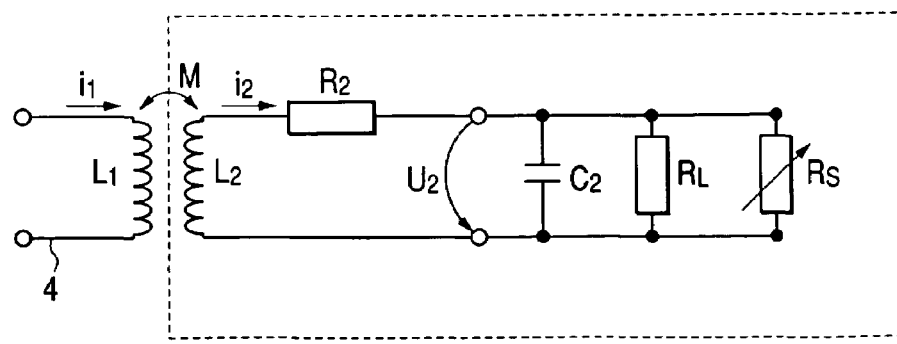
FIG. 19 is a circuit diagram between Mote and a base station or between Motes.
Figure 20:
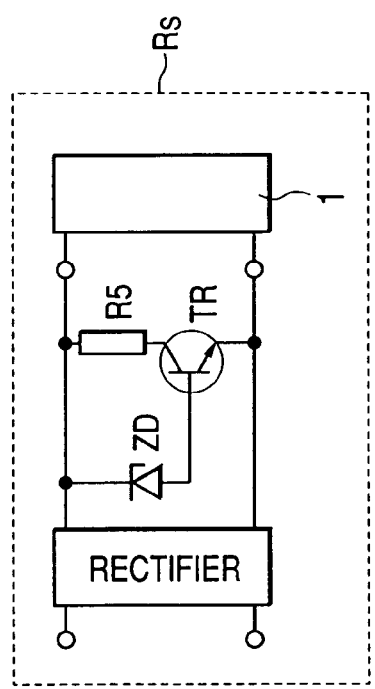
FIG. 20 is a circuit diagram showing the details of an RS circuit portion shown in FIG. 19.

FIGS. 19 and 20 show examples of an additional circuit for making a voltage constant in order not to apply an excessively high voltage to the functional element 1. In FIG. 19, a voltage U2 across a parallel circuit of a capacitor C2 and a resistor RL is maintained constant by a circuit including a variable resistor RS. FIG. 20 shows a circuit portion corresponding to RS shown in FIG. 19. A voltage passed through the rectifier is maintained constant by a variable resistor constituted of a Zener diode ZD, a transistor TR and a resistor R5 and applied to the functional element 1.

The circuits shown in FIGS. 17 to 20 are used when a signal is sent from the base station 4 to each Mote 3 as shown in FIG. 9. The circuits such as shown in FIGS. 21 and 22 are used when a signal is sent from each Mote 3 to the base station 4.

Figure 21:
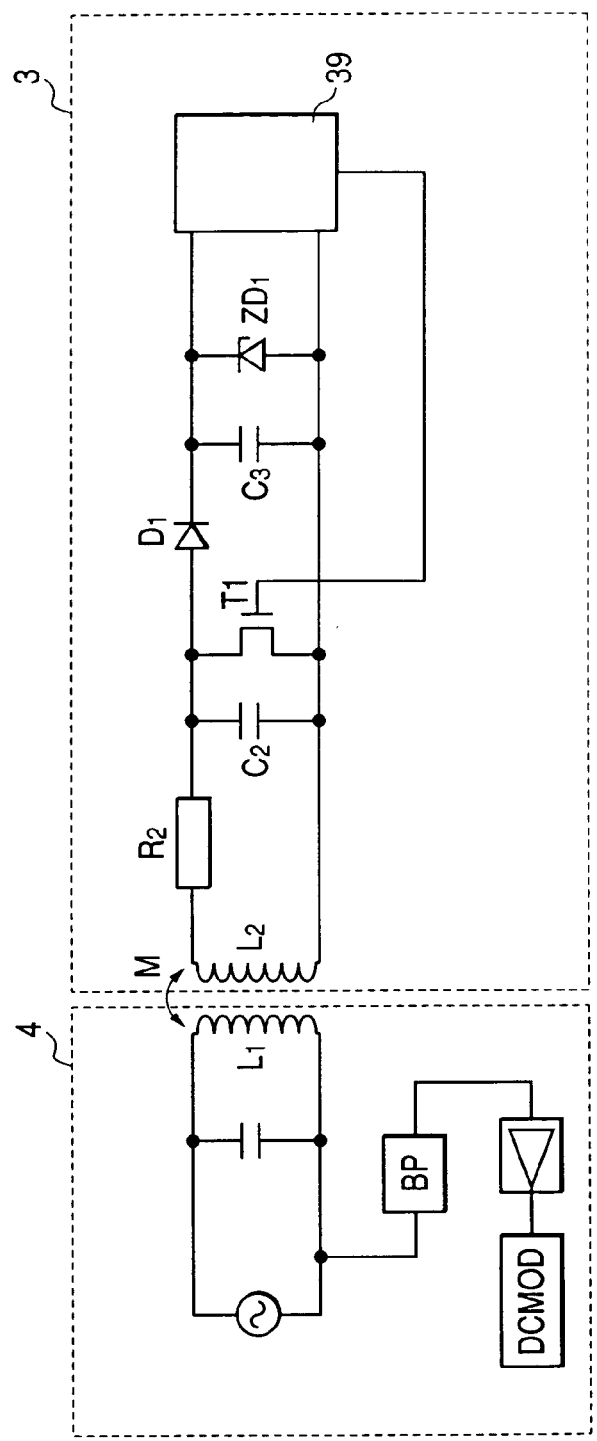
FIG. 21 is a circuit diagram between Mote and a base station.

In FIG. 21, a signal from the functional element 39, e.g., sensing information such as imaging information and position information, is applied to the gate electrode of a transistor T1 connected in parallel to an antenna coil L2. In accordance with the applied signal, the transistor T1 is turned on or off so that the parallel resistance of the antenna coil L2 changes to thereby transmit the information from Mote 3 to the base station 4.

Figure 22:
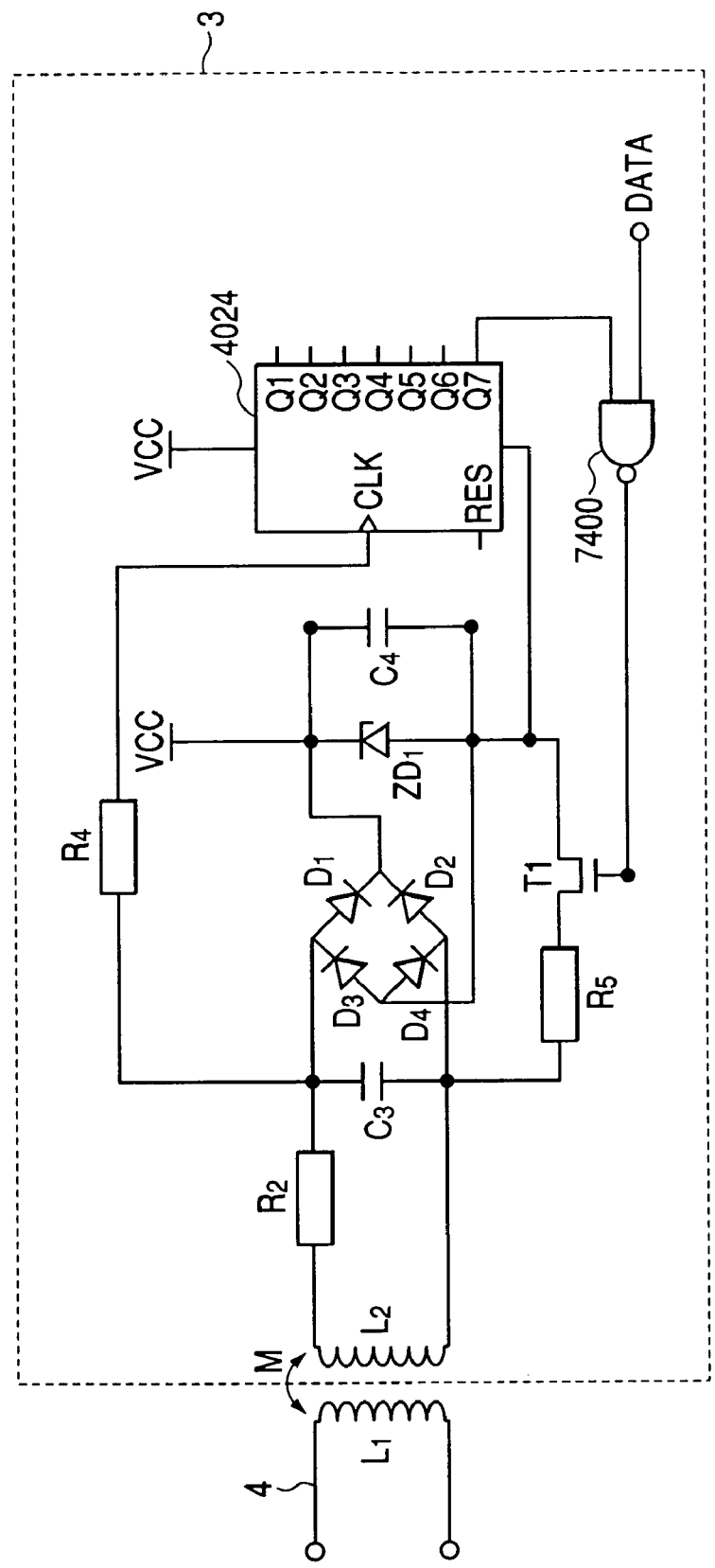
FIG. 22 is a circuit diagram between Mote and a base station or between Motes.

FIG. 22 has an additional digital circuit 4024 which modulates data (DATA) from Mote 3 with an electromagnetic wave through amplitude shift keying (ASK), frequency shift keying (FSK) or phase shift keying (PSK) and transmits the modulated data. If the signal data to be transmitted is subjected to a cryptographic process, it is effective in terms of security to individually access each of a number of Motes 3.

Figure 23:
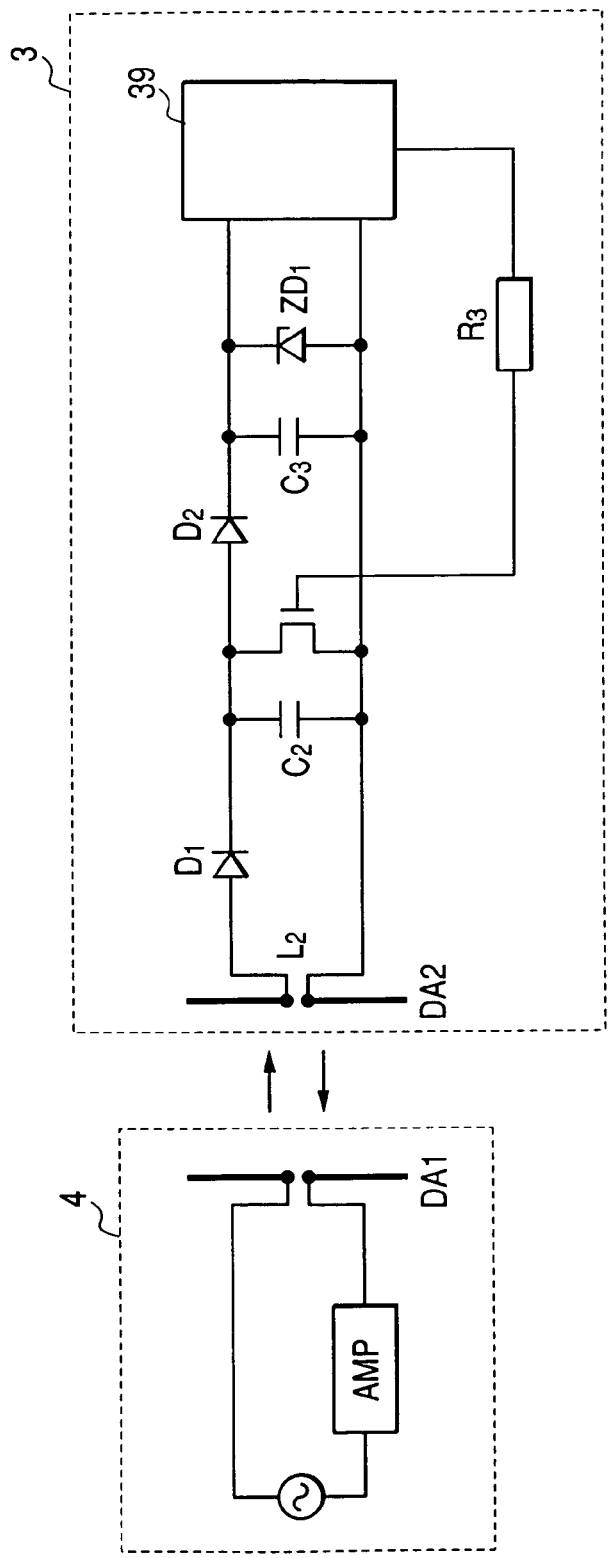
FIG. 23 is a circuit diagram between Mote and a base station.

FIG. 23 is a circuit diagram in which a dipole antenna is used for the base station 4 and Mote 3. An electromagnetic wave transmitted from a dipole antenna DA1 of the base station 4 is received by an antenna DA2 of Mote 3, rectified by a diode D1 and the like and applied to a functional element 39. The resonance frequency of the dipole antenna is adjusted by the length of the antenna as described earlier.

In the following, more specific first to fourth embodiments reducing in practice the above-described embodiments of the invention will be described with reference to the accompanying drawings. In the first specific embodiment, a sensing Mote 34 corresponds to Mote 3 described earlier.

—First Specific Embodiment—

Figure 24:
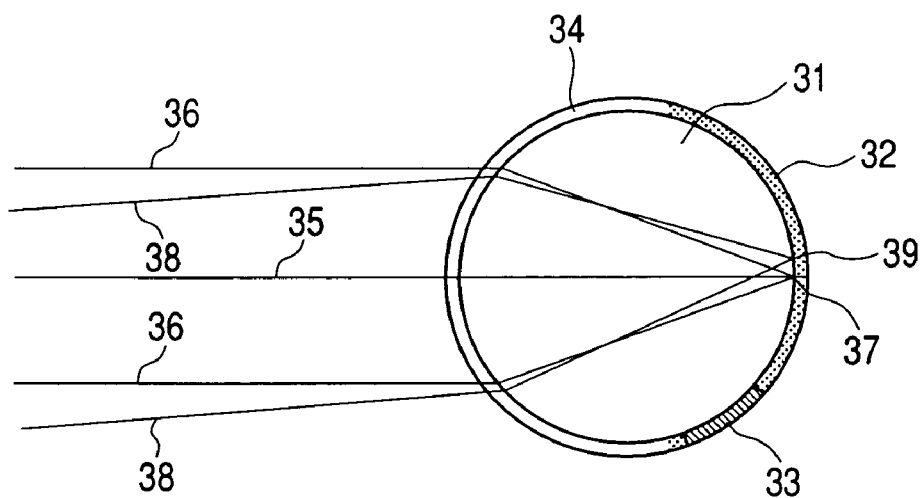
FIG. 24 is a diagram showing an example of application to an imaging system according to a first specific embodiment of the invention.

FIG. 24 shows an example of application to an imaging system according to a first embodiment of the invention. A fine sphere lens 31 is used as the sensing Mote 34. An imaging element 32 is disposed near at the surface of the hemisphere opposite to the incidence side of image pickup light. A communication circuit unit 33 is disposed near at the hemisphere regarded as the same substrate. The communication circuit unit 33 is used for receiving radio waves and transmitting a signal supplied from the imaging element 32. The substrate has a curved surface.

Incidence light 36 incoming along a direction parallel to an optical axis 35 is converged in an area 37 near at the surface of the sphere by the fine sphere lens 31. Light 38 having an angle of view is converged in an area 39 near at the surface of the sphere by the fine sphere lens 31. An image is therefore formed on the surface of the fine sphere. Assuming that the reflectivity of the fine sphere lens is 2, parallel light, i.e., light from an infinite distance, is converted near at the surface of the sphere on the side opposite to the incidence side. For example, this condition is satisfied if glass material S-LAH79 (Ohara) is used, nd=2.003 at the d line (587.6 nm) of visual light. Assuming that the fine sphere lens diameter is 1 mm, a position at 5 cm or longer is approximately in-focus. An image having not so large a chromatic aberration can be obtained.

A filter is disposed on the surface of the sphere lens on the incidence side to select a specific wavelength and suppress the chromatic aberration. An imaging system can be realized which has ten thousand pixels of 100×100 cells having a size of 2 μm. Since a fine sphere is used, a stable Mote can be formed which is not influenced by an external environment.

Figure 25:
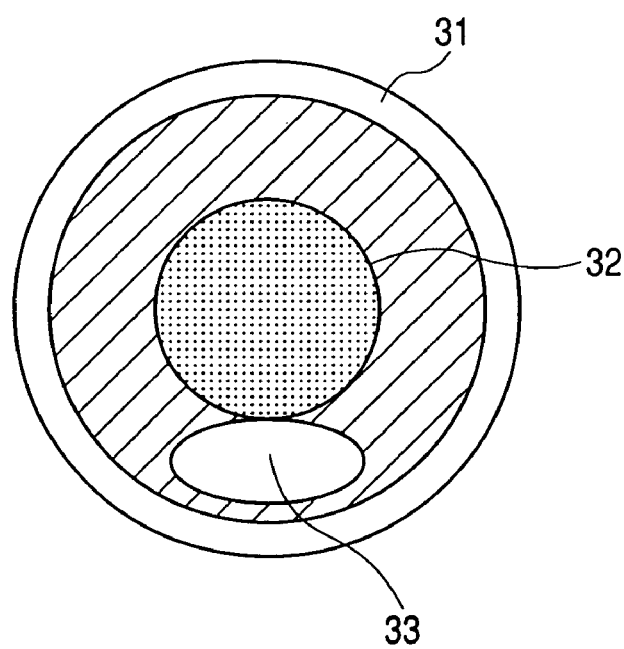
FIG. 25 is a diagram showing the circuit layout as viewed from the imaging element side in a plane perpendicular to an optical axis according to the first specific embodiment of the invention.

FIG. 25 shows the circuit layout as viewed from the imaging element 32 side along the plane perpendicular to the optical axis 35 shown in FIG. 24. The central area corresponds to the imaging element 32, and the communication circuit unit 33 is disposed in the area near the imaging element 32. The imaging element and communication circuit unit are connected by wiring lines formed on the spherical substrate. The communication circuit unit 33 is constituted of an reception antenna for receiving energy from the external, a circuit for supplying power generated from the received energy to an imaging unit, a transmission unit and the like, an input signal processing circuit, a transmission signal processing circuit and the like. An image signal from the imaging element is supplied to the communication circuit unit 33 and transmitted from an antenna circuit disposed near at the transmission circuit.

Figure 26:
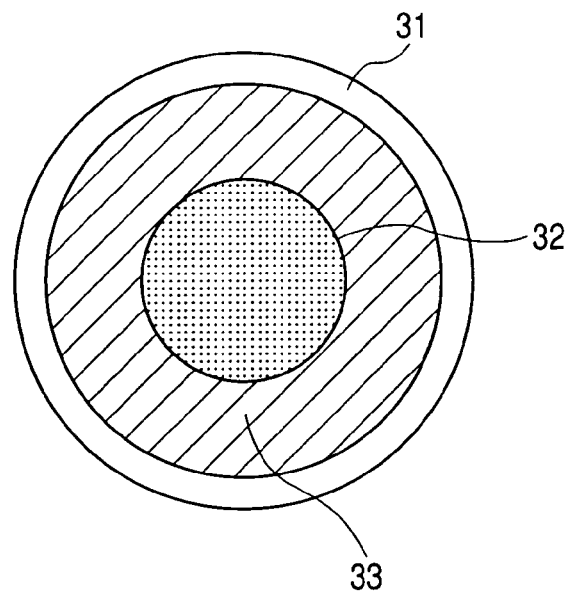
FIG. 26 is a diagram showing a communication circuit unit disposed in the peripheral area of the imaging element according to the first specific embodiment of the invention.

FIG. 26 shows the communication circuit unit 33 disposed in the peripheral area of the imaging element 32 so that the antenna circuit can be disposed concentrically.

Figure 27:
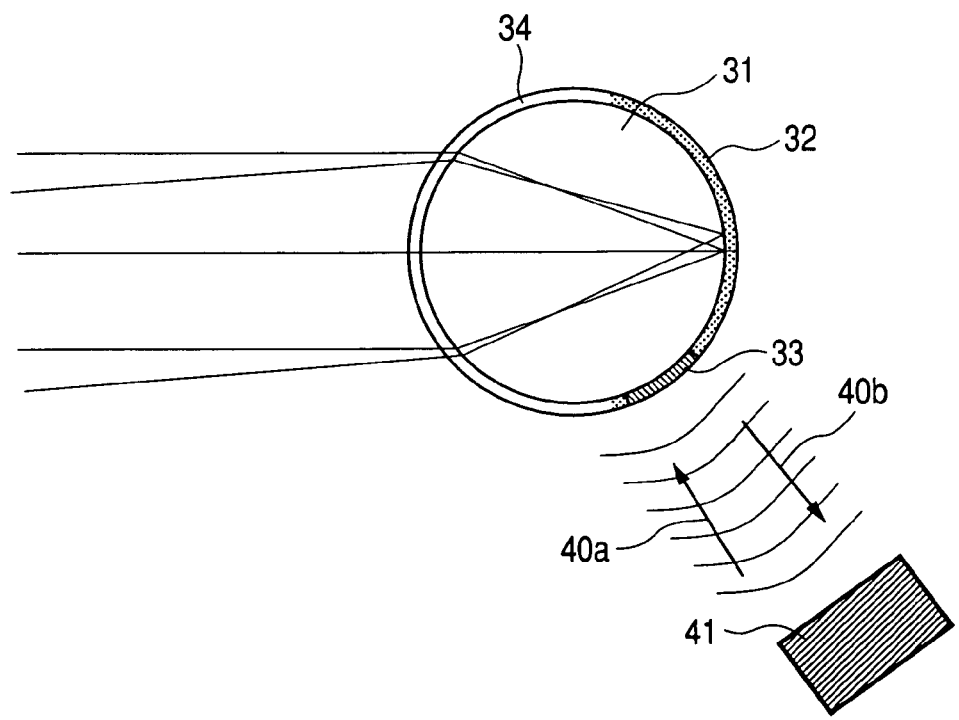
FIG. 27 is a schematic diagram illustrating how imaging information is transmitted to an external (base station) from a fine sphere imaging camera with a communication function, in accordance with a control signal and energy supplied from the external, according to the first specific embodiment of the invention.

FIG. 27 illustrates how imaging information 40b is transmitted to a base station 41 disposed externally from the sensing Mote 34 with the communication function described above, in accordance with a control signal and energy 40a supplied from the base station.

Figure 28:
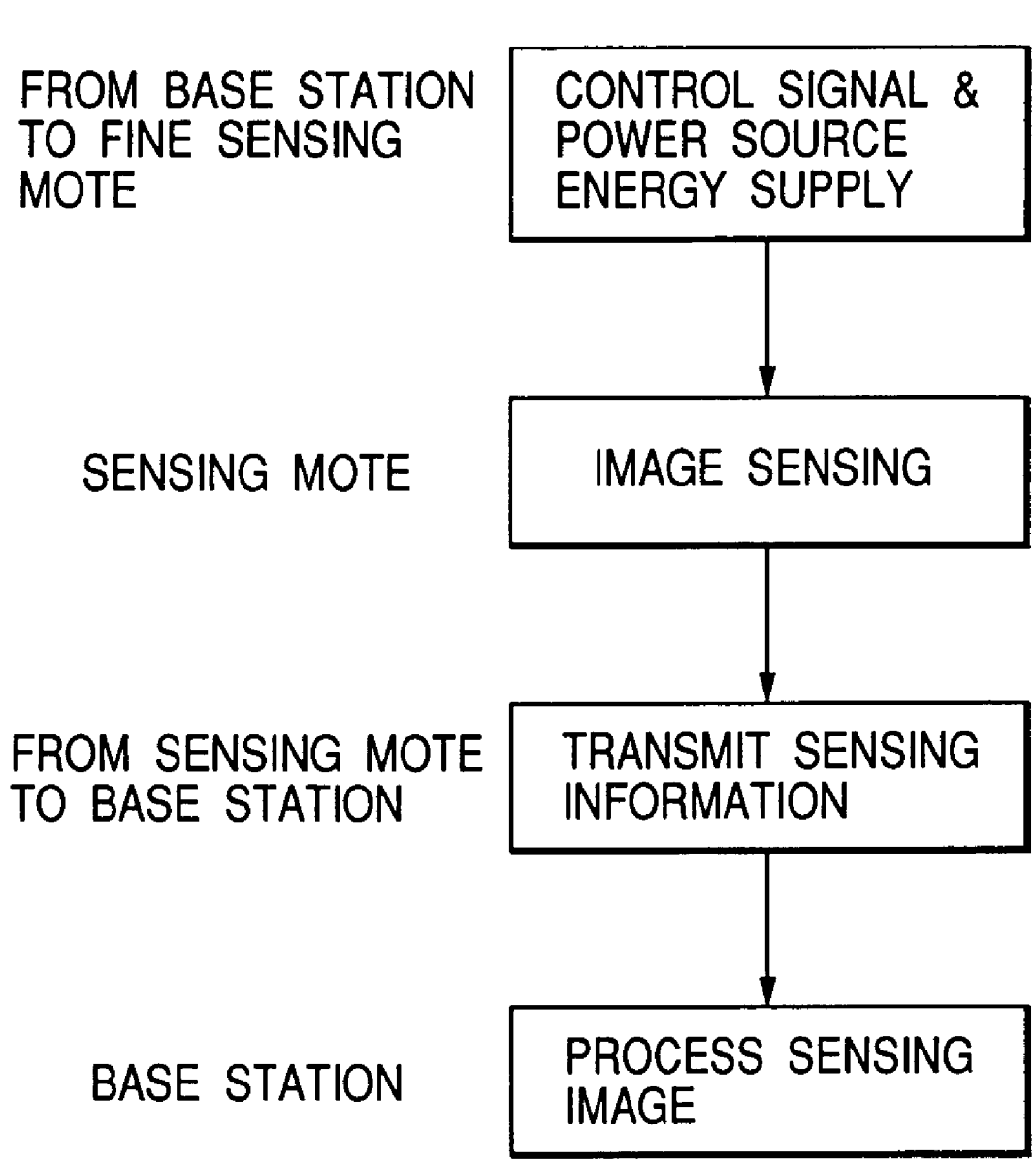
FIG. 28 is a control flow chart according to the first specific embodiment of the invention.

This operation flow will be described with reference to the flow chart shown in FIG. 28.

First, the base station 41 supplies the sensing Mote 34 (in this embodiment, an image sensing Mote having a fine sphere lens imaging element) with a control signal and power energy 40a. This energy may be either radio frequency (RF) waves or light. If the radio frequency waves are used, an RF circuit is used, whereas if light is used, a photoelectric conversion sensor is used.

Next, in response to the control signal 40b from the base station 41, the sensing Mote 34 senses an image. An intensity distribution of an image focussed on the imaging element 32 by the fine sphere lens 31 is sent from the imaging element 32 to the communication circuit unit 33.

Next, the sensing Mote 34 transmits sensing information 40b to the base station 41. In this case, if radio frequency (RF) waves are to be transmitted, this transmission can be performed by partially sharing a reception circuit. If light is to be transmitted, a light emitting source formed on the same substrate as that of the reception circuit may be controlled, or a reflection light signal may be transmitted by controlling a member for reflecting light from the base station 41. In accordance with the received sensing information 40b, the base station 41 performs predetermined image processing to obtain final necessary image information.

Figure 29:
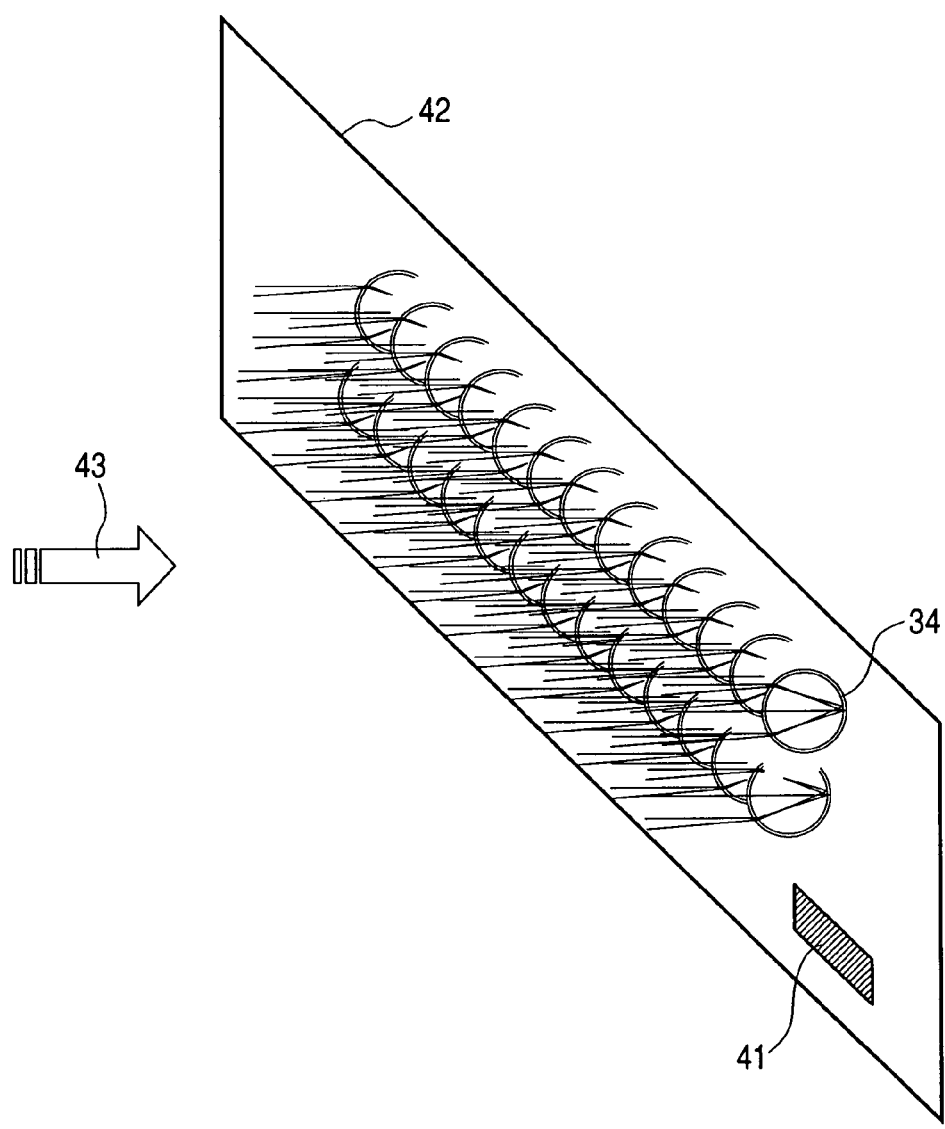
FIG. 29 is a diagram showing a plurality of fine sphere imaging Motes disposed on a card substrate according to the first specific embodiment of the invention.

FIG. 29 shows a plurality of fine sphere image sensing Motes 34 disposed on a card substrate 42. These sensing Motes 34 receive light 43 from a subject. Image information sensed with the sensing Motes 34 is transmitted to a base station 41 disposed on the card substrate 42. If a plurality of image data sets are subjected to high quality image processing and depth information is calculated by utilizing parallax among the sensing Motes 34, image information of a three-dimensional image can be obtained.

Figure 30:
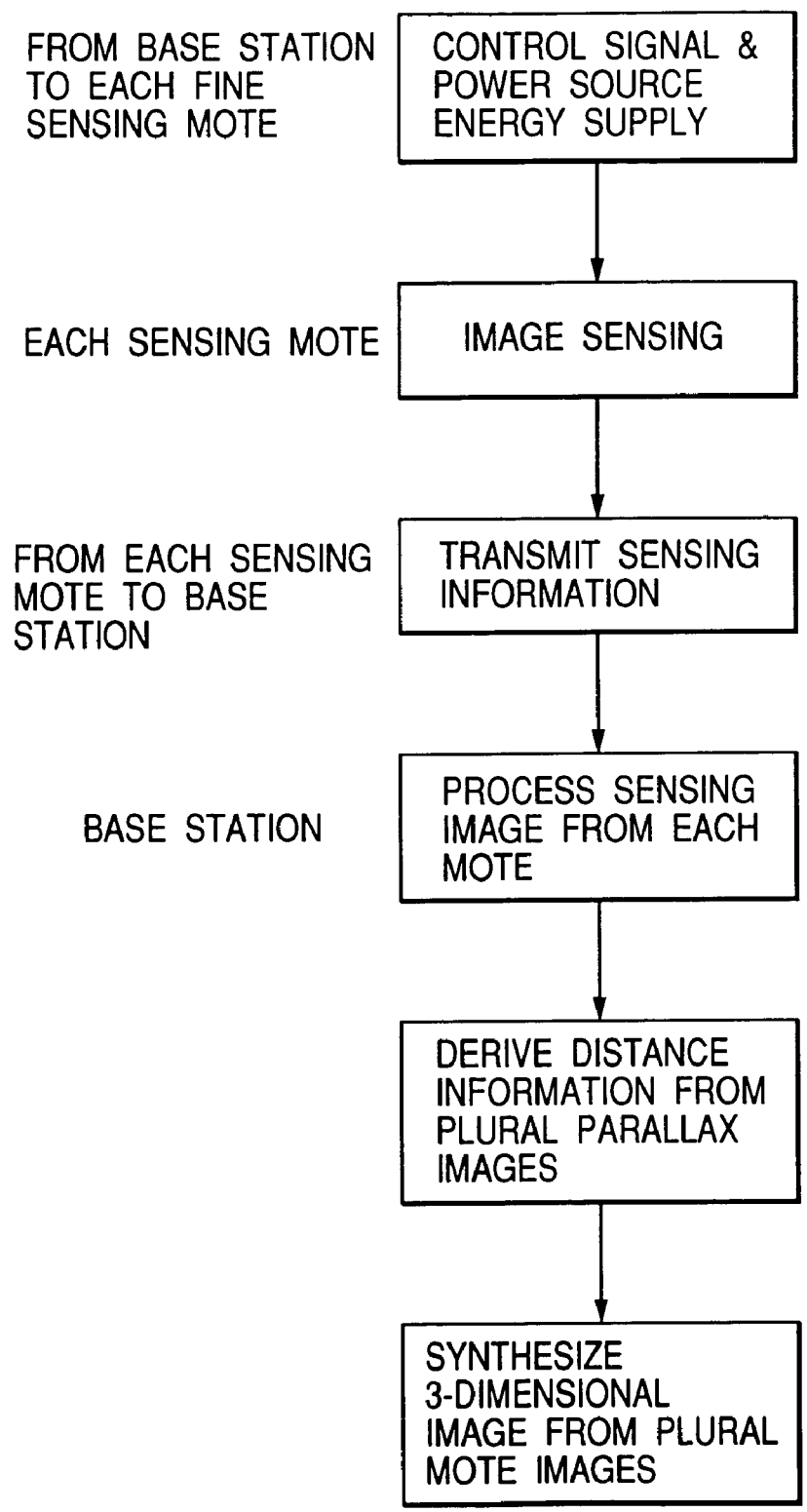
FIG. 30 is a control flow chart according to the first specific embodiment of the invention.

The above-described operation flow is illustrated in the flow chart of FIG. 30.

First, the base station 41 supplies each sensing Mote 34 (in this embodiment, an image sensing Mote having a fine sphere lens imaging element) with a control signal and power energy 40a. This energy may be either radio frequency (RF) waves or light. If the radio frequency waves are used, an RF circuit is used, whereas if light is used, a photoelectric conversion sensor is used.

Next, each sensing Mote 34 senses an image. The sensing order may be parallel or sequential. An intensity distribution of an image focussed on the imaging element 32 by the fine sphere lens 31 is sent from the imaging element 32 to the communication circuit unit 33.

Next, each sensing Mote 34 transmits imaging information 40b to the base station 41. The transmission order may be parallel or sequentially. If radio frequency (RF) waves are to be transmitted, this transmission can be performed by partially sharing the reception circuit. A different frequency may be assigned to each sensing Mote 34 to perform parallel transmission. If light is to be transmitted, a light emitting source formed on the same substrate as that of the reception circuit may be controlled, or a reflection light signal may be transmitted by controlling a member for reflecting light from the base station 41.

In accordance with the received imaging information 40b from the sensing Mote 34, the base station 41 performs predetermined image processing to obtain final necessary image information. For example, subject distance information is derived from a plurality of images with parallax to determine a distance to each image portion and recognize a three-dimensional image from images of a plurality of sensing Mote images.

Figure 31:
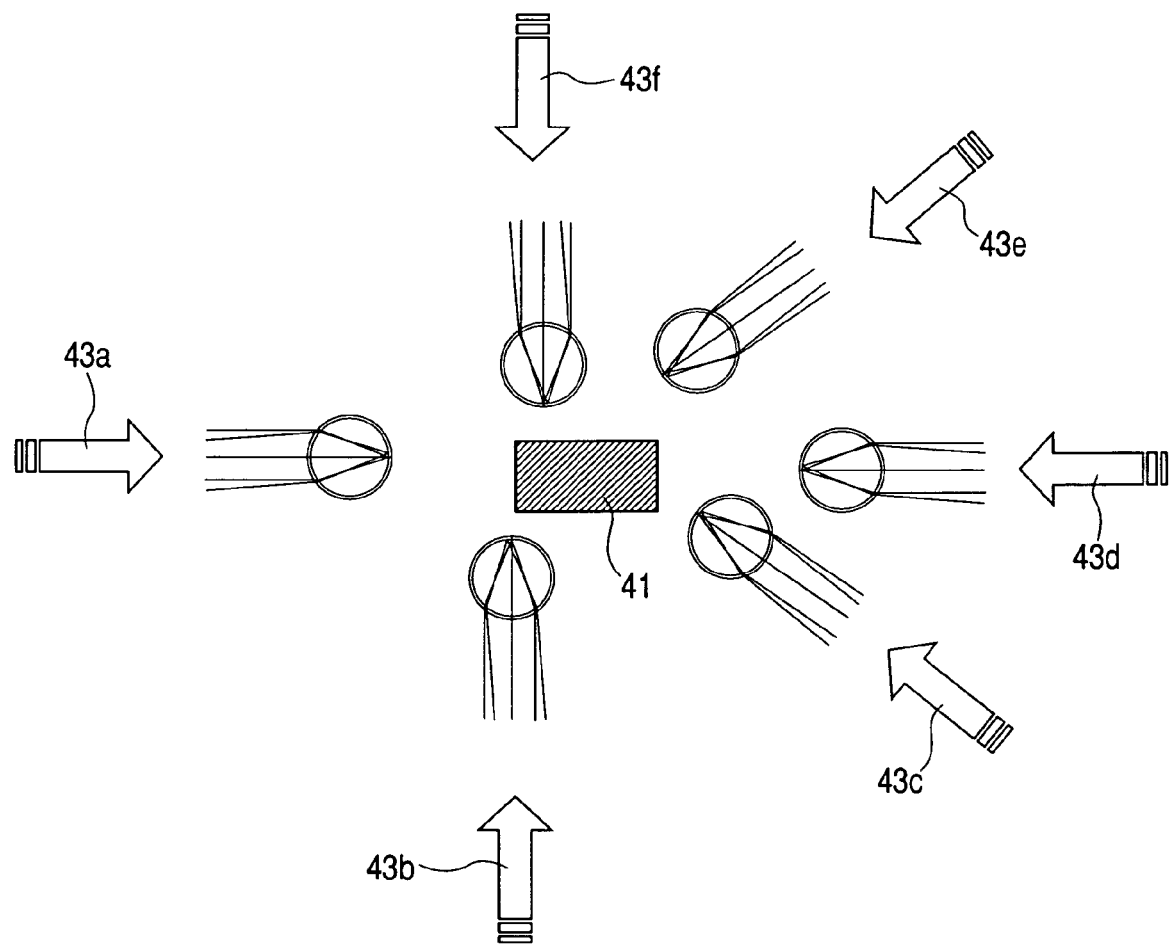
FIG. 31 is a diagram showing fine sphere imaging Motes whose optical axes are directed in various directions to obtain wide angle image information, according to the first specific embodiment of the invention.

FIG. 31 shows a plurality of fine sphere image sensing Motes 34 whose optical axes are directed to various directions to thereby obtain wide angle image information. Light beams 43a to 43f incoming from various directions are input to corresponding sensing Motes 34, and image information is transmitted to the base station 41. The base station 41 synthesizes image information of the light beams 43a to 43f in various directions to create wide angle image information. Each sensing Mote 34 can be mounted on an arbitrary body at an arbitrary angle. Although the functional elements shown in FIG. 8 are disposed on one plane, the embodiment system can acquire a three-dimensional image.

Figure 32:
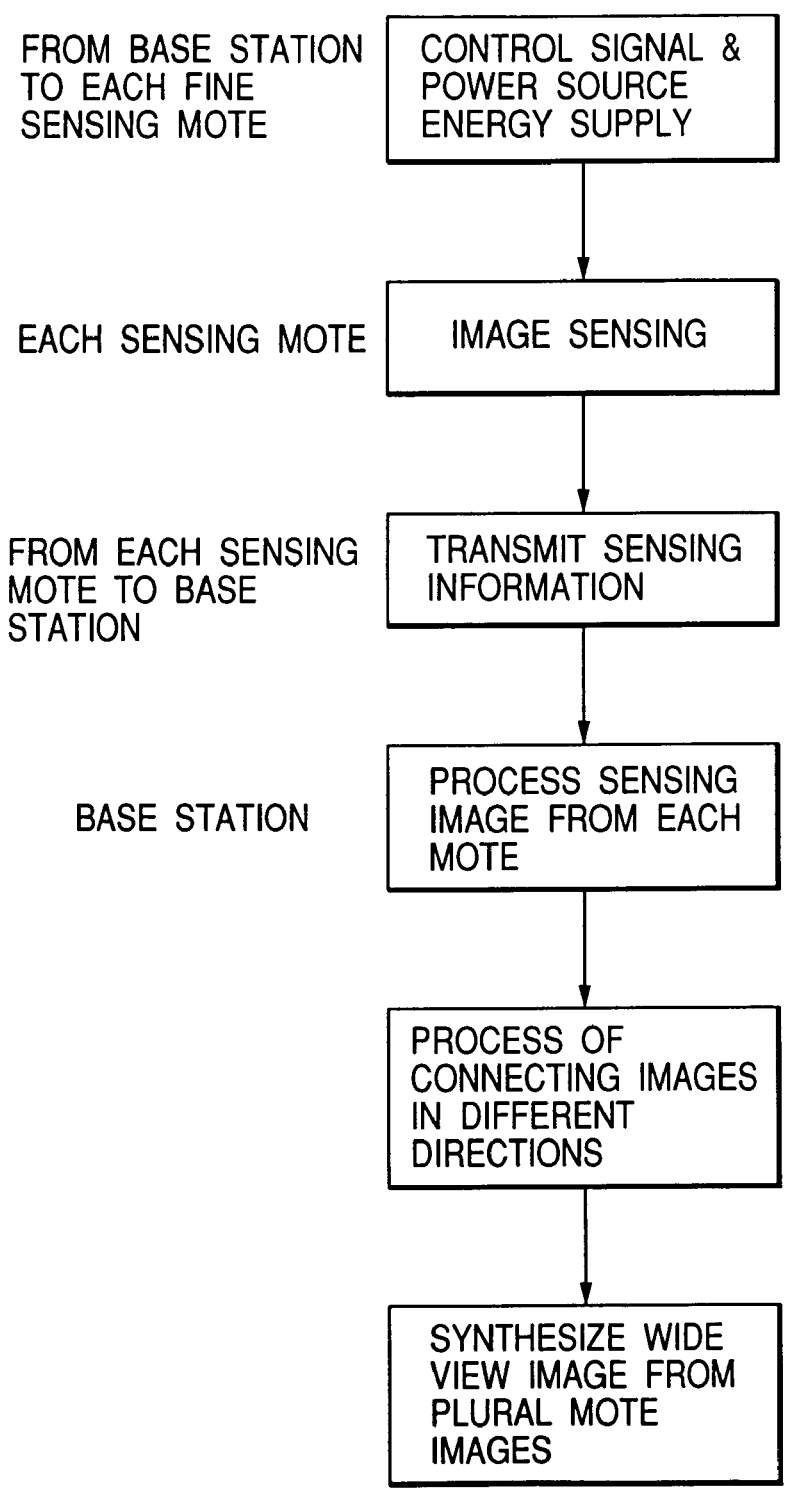
FIG. 32 is a control flow chart according to the first specific embodiment of the invention.

The above-described operation flow is illustrated in the flow chart of FIG. 32.

First, the base station 41 supplies each sensing Mote 34 (in this embodiment, an image sensing Mote having a fine sphere lens imaging element) with a control signal and power energy 40a. This energy may be either radio frequency (RF) waves or light. If the radio frequency waves are used, an RF circuit is used, whereas if light is used, a photoelectric conversion sensor is used.

Next, each sensing Mote 34 senses an image. The sensing order may be parallel or sequential. An intensity distribution of an image focussed on the imaging element 32 by the fine sphere lens 31 is sent from the imaging element 32 to the communication circuit unit 33.

Next, each sensing Mote 34 transmits imaging information 40b to the base station 41. The transmission order may be parallel or sequentially. If radio frequency (RF) waves are to be transmitted, this transmission can be performed by partially sharing the reception circuit. If light is to be transmitted, a light emitting source formed on the same substrate as that of the reception circuit may be controlled, or a reflection light signal may be transmitted by controlling a member for reflecting light from the base station.

In accordance with the received imaging information 40b from each sensing Mote 34, the base station 41 performs predetermined image processing to obtain final necessary image information. The imaging information 40b supplied from the sensing Motes 34 directed to a plurality of different directions is subjected to a process of combining the information and obtaining one wide angle image, to thus obtain a 360□ panorama image.

Figure 33:
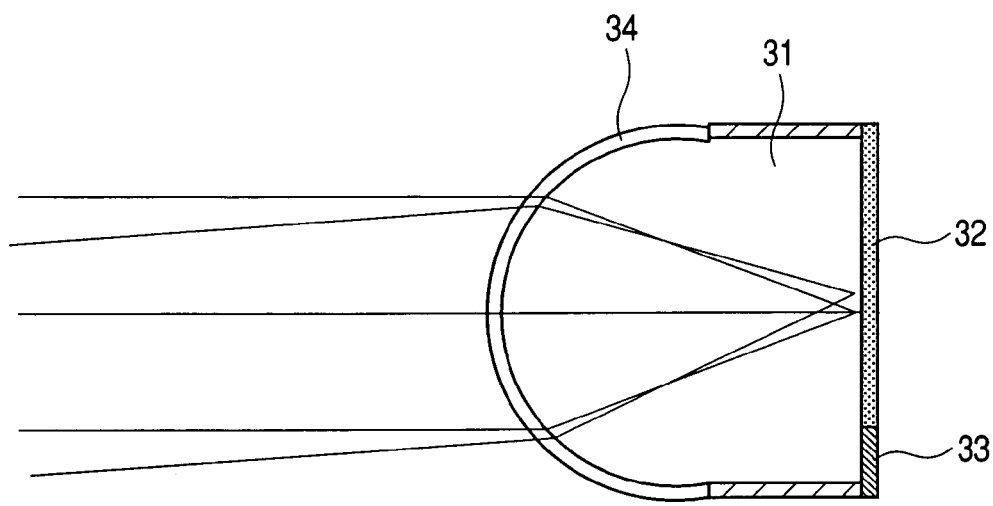
FIG. 33 is a diagram showing an imaging element of a fine sphere image sensing Mote, the imaging element having a flat plane.

FIG. 33 is a diagram showing an imaging element 32 of a fine sphere image sensing Mote 34, the imaging element having a flat plane. Although the imaging element 32 having a flat plane increases aberration, circuits can be formed easily on the flat plane substrate. This flat plane can be incorporated in the application which does not consider the image quality not so important. After the fine sphere lens 31 is formed, the imaging side is polished to form a flat plane and a parallel flat plate formed additionally is attached to the flat plane. This is a easy manufacture method. An imaging element 32, a communication circuit unit 33 and the like are formed in advance on a flat plane substrate and thereafter the flat plane substrate is adhered to the parallel flat plate.

With this structure, it is not necessarily required to set the reflectivity of the fine sphere lens 31 to "2", but the thickness of the parallel flat plane is set so that an image can be focussed on the imaging plane. The lens may be a sphere sapphire lens of LaSFN9 at nd=1.850 suitable for use in severe conditions (high strength, high rigidity, chemical resistance, transmission at IR) or a ruby sphere lens of A1203 at nd=1.77. General glass material of BK7 at nd=1.517 may be used for forming a very inexpensive sensing Mote 34.

Figure 34:
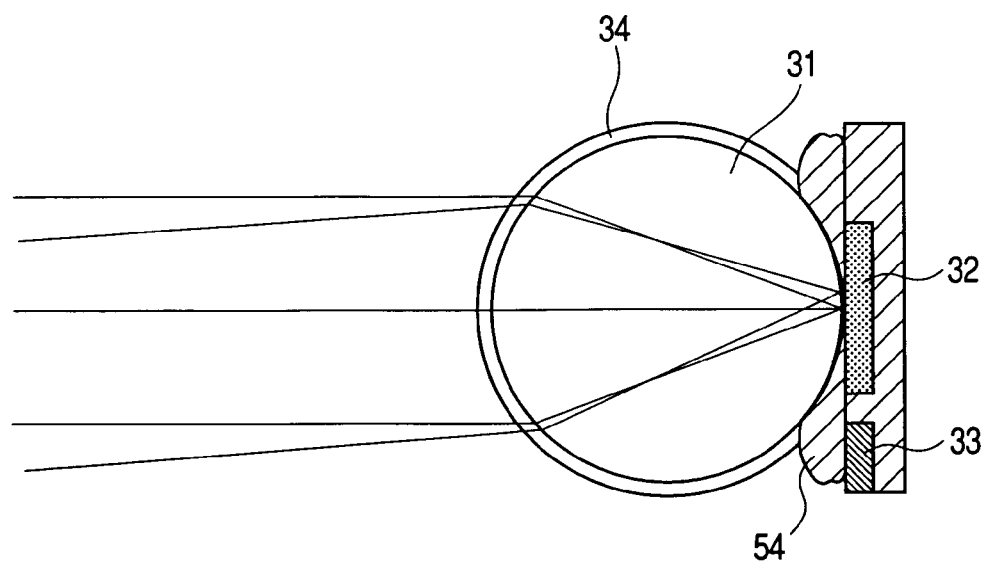
FIG. 34 shows a fine sphere lens in which a flat plane substrate formed with electronic circuits such as an imaging element and a communication circuit unit is adhered to the lens by using adhesion, according to the first specific embodiment of the invention.

FIG. 34 shows a fine sphere lens 31 in which a flat plane substrate formed with electronic circuits such as an imaging element 32 and a communication circuit unit 33 is adhered to the lens 31 by using adhesion 54, without forming the circuit series directly on the surface of the lens 31. The adhesion 54 constitutes a portion of the lens system. Light having an angle of view more displaced from the optical axis is more susceptible to the influence of aberration. However, this fine sphere lens can be used if the application does not require so high a resolution. The manufacture method described above can manufacture a very inexpensive sensing Mote 34 so that the application range can be broadened.

Since the Mote can be manufactured together with a general electronic circuit substrate, the application of the Mote can be further broadened. The following second to fourth specific embodiments show an application of the functional element of the invention to a function of detecting a remaining ink amount in an ink cartridge of a printer such as an ink jet printer and a bubble jet (R) printer.

—Second Specific Embodiment—

Figure 35:
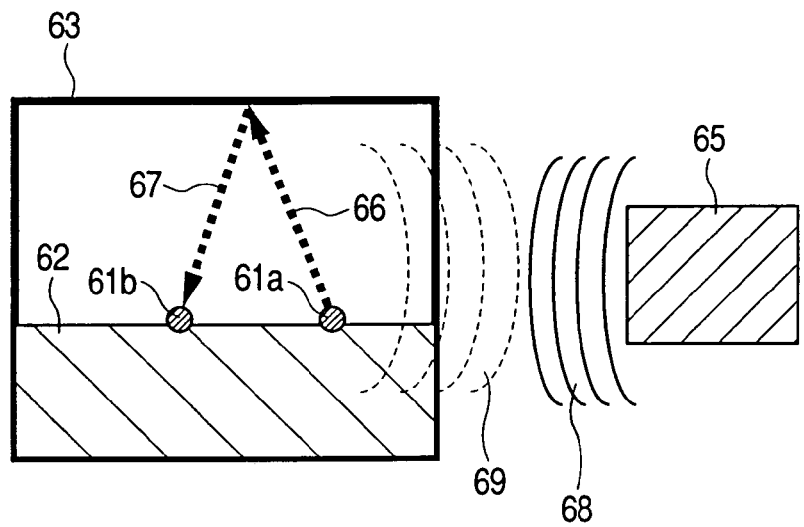
FIG. 35 is a diagram illustrating an application example of an ink remaining amount detecting method according to a second specific embodiment of the invention.

FIG. 35 illustrates an application example to an ink remaining amount detecting method according to a second specific embodiment of the invention.

Fine functional elements 61a and 61b each have a communication function, a sensing function and a power source function of converting radio frequency waves transmitted from a base station 65 into energy.

The fine functional elements 61a and 61b are housed in a cartridge tank 63 together with ink 62. The base station 65 communicates with the fine functional elements 61a and 61b, controls and collectively manages the functions of the fine functional elements. The base station also has a function of transmitting energy to the fine functional elements 61a and 61b through wireless communication used as data communication means.

The fine functional elements 61a and 61b float on the surface of ink 62. FIG. 35 illustrates how a control signal and energy 68 are transmitted from the base station 65 to the fine functional elements 61a and 61b.

Upon supply of the control signal and energy 68, the fine functional elements 61a and 61b perform a predetermined sensing operation. For example, the fine functional element 61a emits light 66 which is reflected at the upper surface of the cartridge tank 63. This reflected light 67 is received by a sensing reception unit of the fine functional element 61b. The fine functional element 61b transmits the sensed information 69 to the base station 65 which in turn judges the remaining amount of ink 62 in accordance with the sensed information 69. The fine functional elements 61a and 61b have fundamentally the same structure, and their functions assigned to each functional element are controlled in accordance with a signal from the base station 65.

Figure 36:
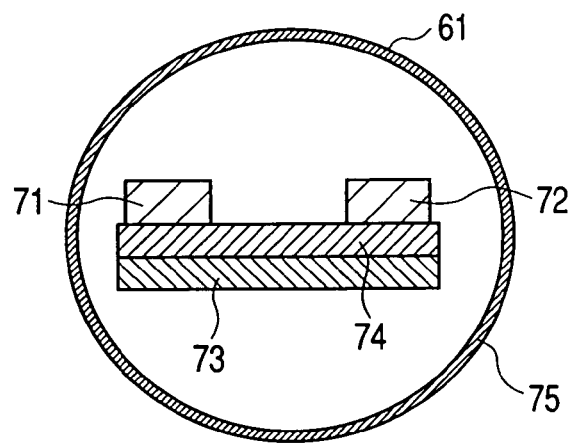
FIG. 36 is a detailed diagram showing the structure of fine functional elements according to the second specific embodiment of the invention.

Next, with reference to FIG. 36, the structure of the fine functional elements 61a and 61b will be described in detail. The fine functional elements 61a and 61b have fundamentally the same structure, and so the structure of a fine functional element 61 representative of the two elements will be described in the following.

The fine functional element 61 is constituted of a sensing unit 71, a communication unit 72, a power source unit 73, a processing unit 74 and a protective unit 75. The sensing unit 71 is constituted of a sensing transmission unit and a sensing reception unit. The communication unit 72 is constituted of a communication transmission unit and a communication reception unit which are constituted of an antenna, a transmission circuit and a reception circuit. The power source unit 73 is constituted of a communication reception unit, an energy conversion circuit for making the fine functional element 61 use energy from the base station 65 received at the communication reception unit and antenna of the communication reception unit, and an energy storing unit for storing the energy. The processing unit 74 performs a specific process in response to a control signal from the base station 65. The protective unit 75 protects the sensing unit 71, communication unit 72, power source unit 73 and processing unit 74 from ink 62 and moisture in the ink tank 63.

Figure 37:
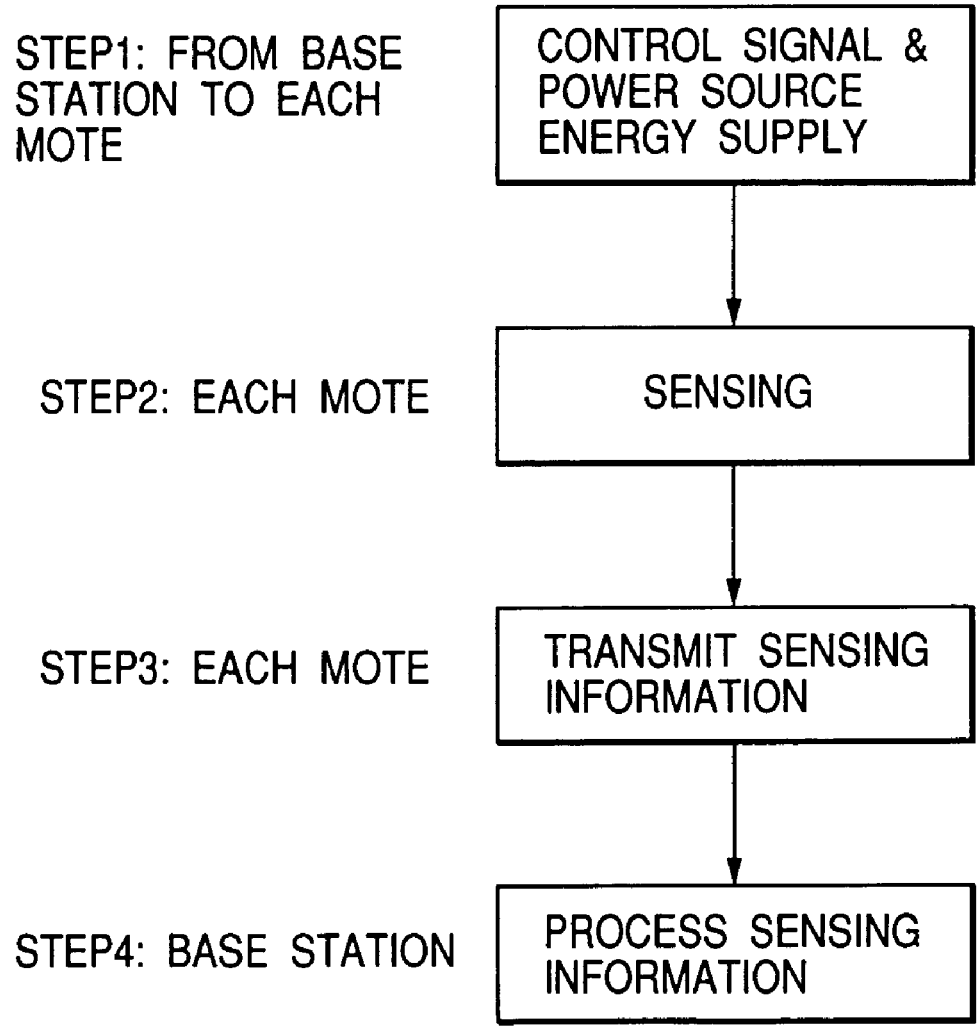
FIG. 37 is a control flow chart according to the second specific embodiment of the invention.

The operation flow described above will be described with reference to the flow chart shown in FIG. 37.

First at Step 1 the base station 65 supplies the fine functional element 61 with a control signal and power source energy 68. In this embodiment, the energy supply is performed by using radio waves.

Next at Step 2 in accordance with the control signal 68 sent from the base statio 65, the fine functional element 61 transmits sensed information from the sensing transmission unit. The fine functional element 61 transmitting sensed information and the fine functional element 61 receiving the sensed information are controlled by the control signal 68 from the base station 65.

Next at Step 3 the fine functional element 61 received the sensed information transmits the sensed information 69 to the base station 65.

Next at Step 4 the base station 65 judges the remaining amount of ink 62 in accordance with the sensed information 69.

As described above, by housing the fine functional element 61 having the sensing and communication functions in the ink cartridge 63, it becomes possible to improve the remaining amount measuring precision of ink 62. By providing the wireless communication function, the ink remaining amount can be measured without any erroneous operation even if water soluble substance such as ink flows out.

—Third Specific Embodiment—

Figure 38:
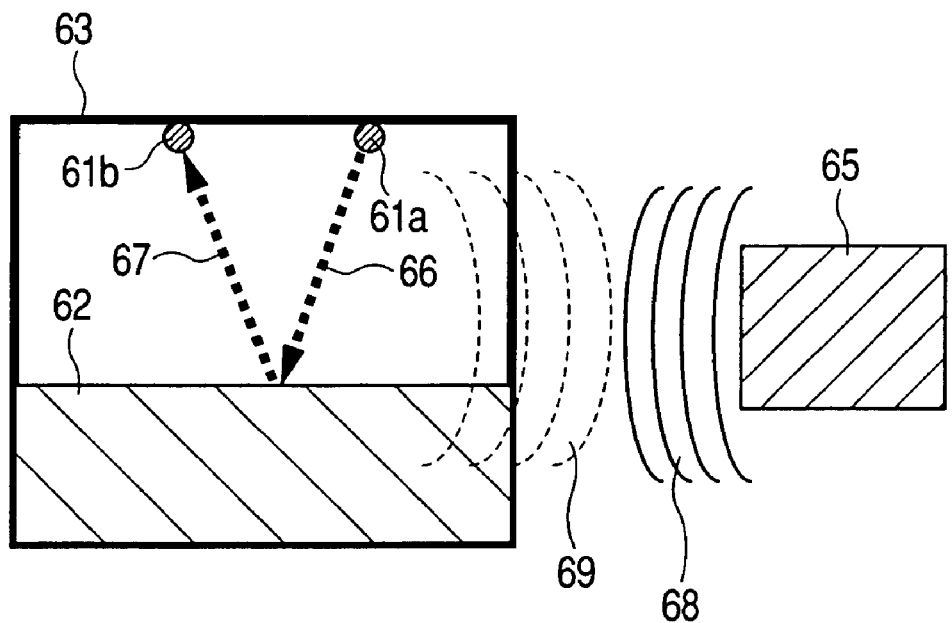
FIG. 38 is a diagram illustrating an application example of an ink remaining amount detecting method according to a third specific embodiment of the invention.

FIG. 38 illustrates an application example to an ink remaining amount detecting method according to a third specific embodiment of the invention.

Fine functional elements 61a and 61b each have a communication and sensing function and a power source function of converting radio frequency waves transmitted from a base station 65 into energy.

The fine functional elements 61a and 61b are housed in a cartridge tank 63 together with ink 62. The base station 65 communicates with the fine functional elements 61a and 61b, controls and collectively manages the functions of the fine functional elements. The base station also has a function of transmitting energy to the fine functional elements 61a and 61b through wireless communication used as data communication means.

The fine functional elements 61a and 61b are disposed on the upper wall of the cartridge tank 63. FIG. 38 illustrates how a control signal and energy 68 is transmitted from the base station 65 to the fine functional elements 61a and 61b. Upon supply of the control signal and energy 68, the fine functional elements 61a and 61b perform a predetermined sensing operation. For example, the fine functional element 61a emits light 66 from a sensing transmission unit which light is reflected at the surface of ink 62. This reflected light 67 is received by a sensing reception unit of the fine functional element 61b.

Similar to the first specific embodiment, the fine functional element 61b transmits the sensed information 69 to the base station 65 which in turn judges the remaining amount of ink 62 in accordance with the sensed information.

—Fourth Specific Embodiment—

Figure 39:
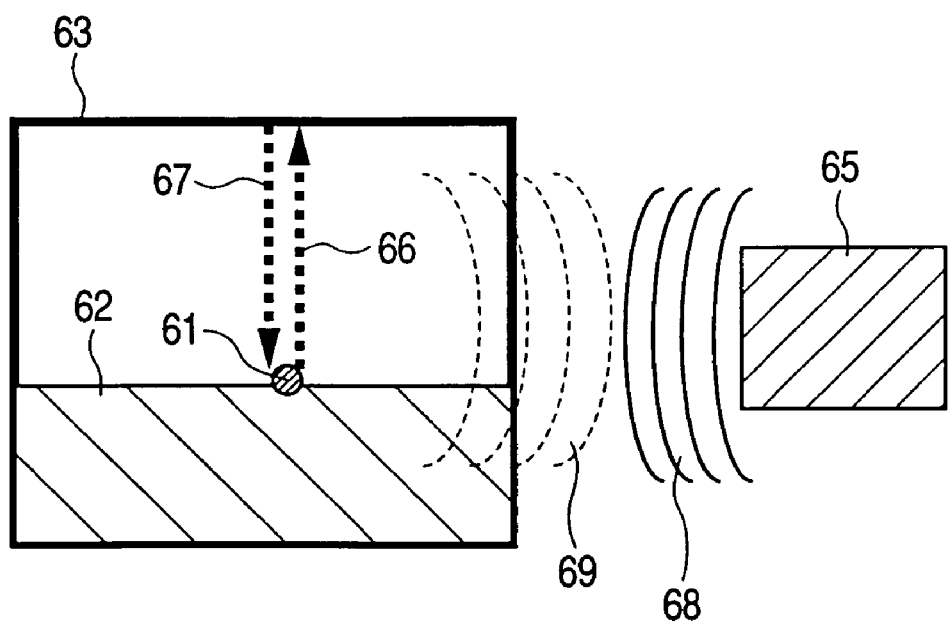
FIG. 39 is a diagram illustrating an application example of an ink remaining amount detecting method according to a fourth specific embodiment of the invention.

FIG. 39 illustrates an application example to an ink remaining amount detecting method according to a fourth specific embodiment of the invention.

A fine functional element 61 has a communication and sensing function and a power source function of converting radio frequency waves transmitted from a base station 65 into energy.

The fine functional element 61 is housed in a cartridge tank 63 together with ink 62. The base station 65 communicates with the fine functional element 61, controls and collectively manages the functions of the fine functional element. The base station also has a function of transmitting energy to the fine functional elements 61 through wireless communication used as data communication means.

The fine functional element 61 floats on the surface of ink 62 in the cartridge tank 63.

FIG. 39 illustrates how a control signal and energy 68 is transmitted from the base station 65 to the fine functional element 61. Upon supply of the control signal and energy 68, the fine functional element 61 performs a predetermined sensing operation. For example, the fine functional element 61 emits light 66 from a sensing transmission unit which light is reflected at the upper inner wall of the ink cartridge 63. This reflected light 67 is received by a sensing reception unit of the fine functional element 61. The fine functional element 61 transmits the sensed information 69 to the base station 65 which in turn judges the remaining amount of ink 62 in accordance with the sensed information.

Fifth Embodiment

Figure 40:
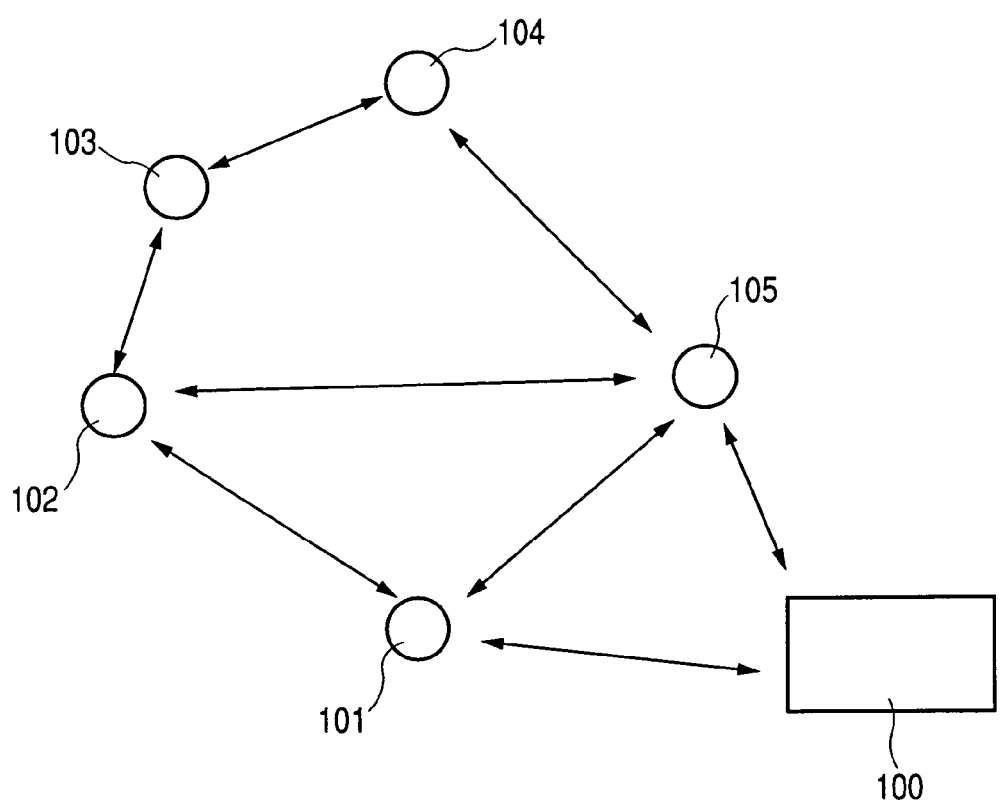
FIG. 40 is a diagram illustrating the concept of a functional element group according to the invention.

FIG. 40 shows a sensing network system consisting of functional elements 101 to 105 and a base station 100. Each functional element has a wireless communication function (first function) and a function (second function) of sensing the state of an environment, such as temperature, humidity, magnetic field, electric field, acceleration speed, position, direction and density of specific chemical seed.

The functional element 101 communicates with the base station 100. The functional element 101 receives sensing timing information from the base system 100 and transmits the sensed information to the base system 100. Each of the functional elements 102, 103 and 104 communicates with the base station 100 via another or other functional elements. In the example shown in FIG. 40, in addition to the communication with the base station 100, communications between functional elements are also performed such as between the functional elements 102 and 105 and between the functional elements 101 and 105. In this manner, in accordance with the location and environment of each functional element, optimum information can be sent to the base station 100 most efficiently.

Although the base station 100 is shown in FIG. 40, a particular functional element may function as the base station. This particular base station 100 functions as a relay base station for transferring the information sensed at each functional element to another functional element.

Figure 41:
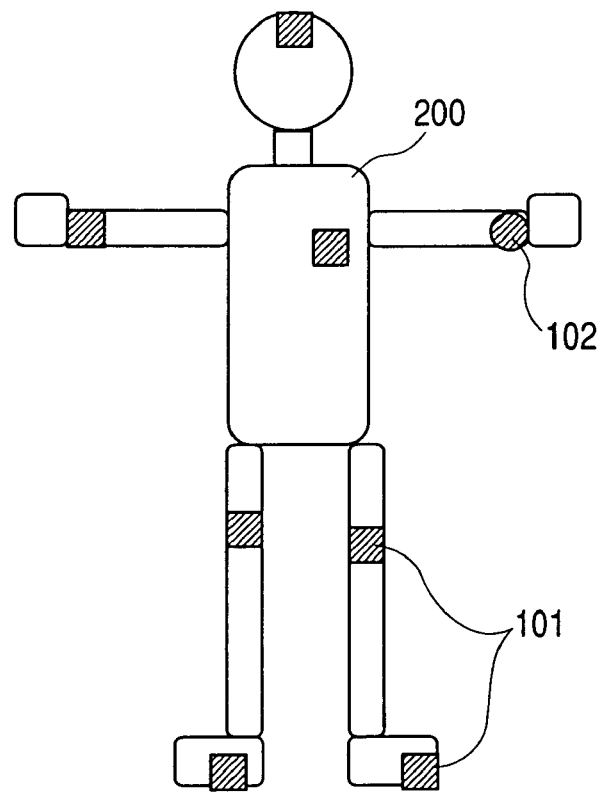
FIG. 41 is a diagram showing an example of the structure of a functional element group according to the invention.

This embodiment will be described in more detail. For example, monitoring the state of a person will be described with reference to FIG. 41. Conventionally when a body temperature is measured, a thermometer is made in contact with a particular area such as armpit, tongue and ear.

In this embodiment, functional elements (sensing Motes) 101 and 102 of the invention each having a body temperature measuring sensor are adhered to various areas of a human body 200 such as foot sole, thigh, back, arm and head, to thereby measure a change in the body temperature in each area. In this manner, the state of a body can be grasped more correctly. A subject to be sensed may be a blood pressure in addition to a body temperature.

In the sixth to fourteenth embodiments to be described later, the structure and operation of hardware for wireless communications will not be described. This is because the wireless communications are performed between respective functional elements or between each functional element and base station, as will be detailed in the twelfth embodiment.

Sixth Embodiment

If a base station exists which manages each functional element, it is possible to make each unit of each functional element function at what timing, and to acquire information sensed by each functional element by communicating with the element and collectively manage the information acquired from all the functional elements. It is herein assumed that the base station has not only an interface function with another system but also a function of managing and controlling each functional element.

Figure 42:
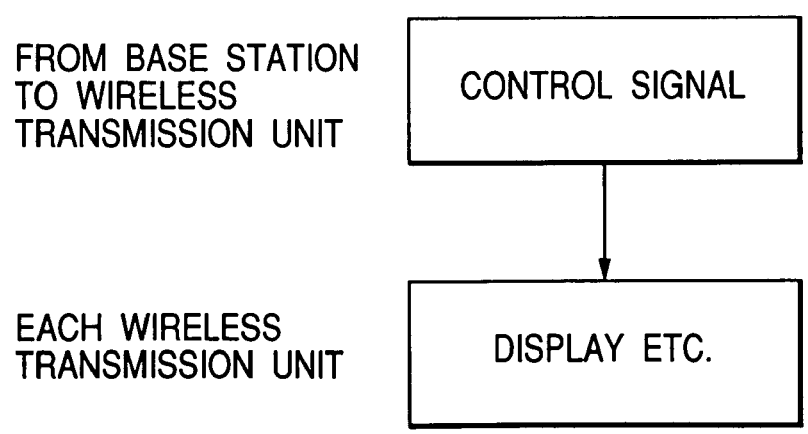
FIG. 42 is a diagram showing an example of a communication procedure for the functional element group according to the invention.
Figure 43:
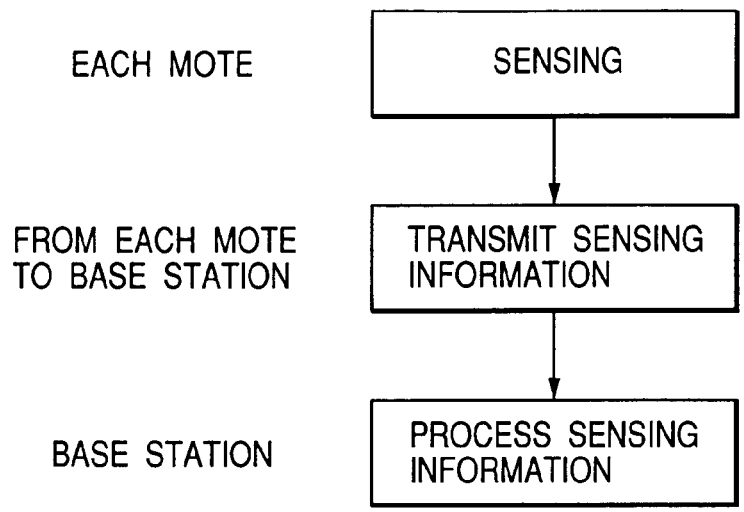
FIG. 43 is a diagram showing an example of a communication procedure for the functional element group according to the invention.
Figure 44:
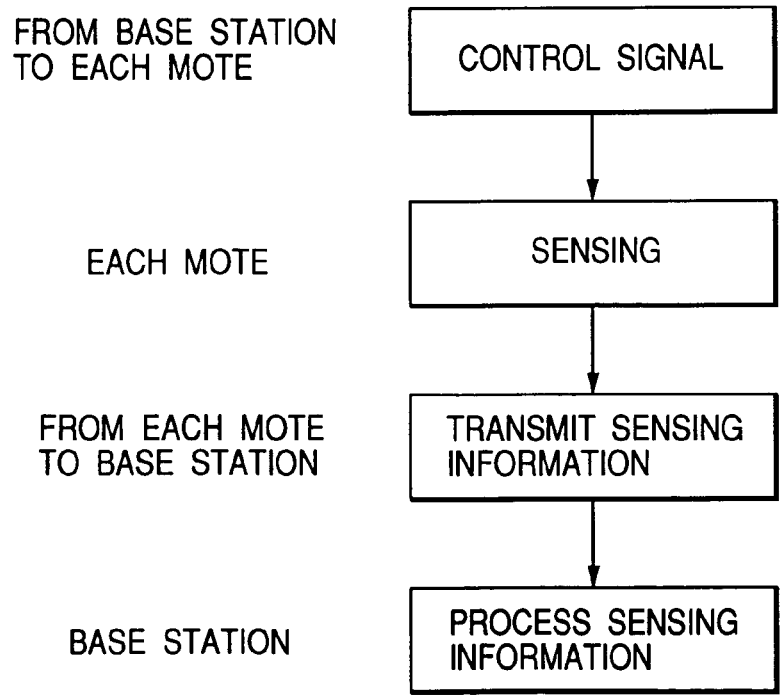
FIG. 44 is a diagram showing an example of a communication procedure for the functional element group according to the invention.

FIGS. 42, 43 and 44 show communication procedures between a functional element and base station according to the invention. The communication procedure is classified into the three types.

In the first communication procedure, as shown in FIG. 42, after a control signal is received from the base station, each functional element (each wireless transmission unit) provides its function. For example, in the case of a display device, the base station sends a display-on signal to each functional element 1 disposed in a matrix shape, e.g., each unit of a displaying element. In this manner, an image or text can be displayed on the whole screen of the display device. In this example, after the control signal is sent to each functional element, although each functional element provides its function, the functional element is not necessary for transmitting a signal to the base station.

In the second communication procedure, as shown in FIG. 43, each functional element (each wireless transmission unit) executes its sensing function and the sensed information is transmitted to the base station. Since each functional element sends the sensed information to the base station at the timing when sensing is completed, a control signal from the base station is unnecessary. This second communication procedure is utilized, for example, only when a particular subject is recognized by using imaging elements, the recognized signal is sent to the base station. Although the base station is required to be always able to receive a signal from each functional element, a consumption power can be reduced by always flowing a small current (in a standby state), and when a transmission ready signal is received from each functional element, increasing power to perform a reception operation.

In the third communication procedure, as shown in FIG. 44, first the base station sends a control signal to each functional element (each wireless transmission unit). The functional element provides its function in accordance with the timing and contents of the control signal, and transmits the sensed information to the base station. For example, if the base station desires to take an image, a corresponding signal is sent to the functional element, and at this timing the imaging data is sent to the base station.

Seventh Embodiment

A functional element group of the invention with each functional element being provided with a sensing function forms a sensing network system for managing information.

Figure 45:
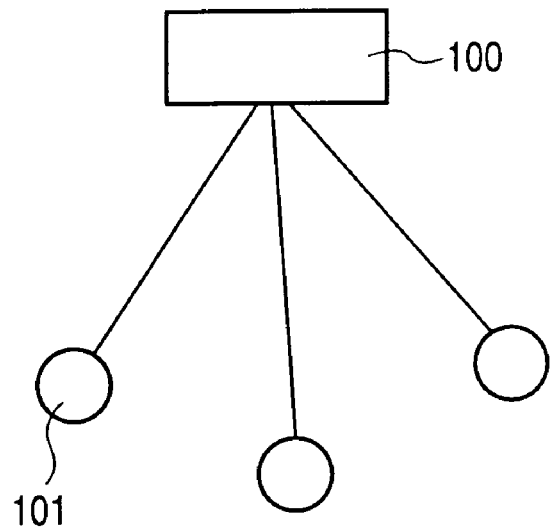
FIG. 45 is a diagram showing an example of a network structure of a functional element group according to the invention.
Figure 46:
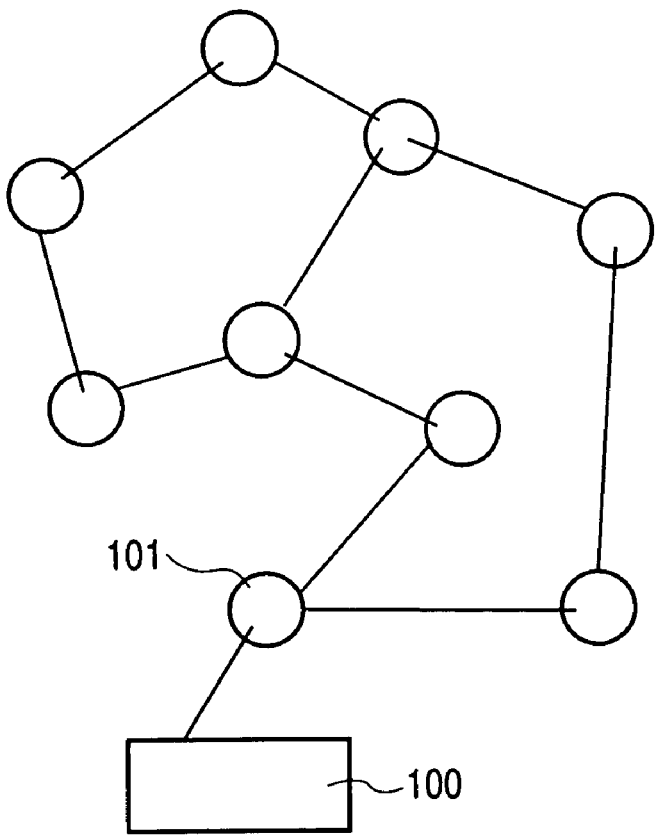
FIG. 46 is a diagram showing an example of a network structure of a functional element group according to the invention.

FIGS. 45 and 46 are schematic diagrams showing routes of networks.

FIG. 45 shows a star type network in which a base station 100 concentratedly manages respective functional elements. This network is effective if the number of functional elements (sensors) is small.

FIG. 46 shows a multi-hop type network in which data is transferred via a plurality of functional elements. Even if a distance between adjacent functional elements is short, a long distance transmission is possible by connecting respective functional elements sequentially. A plurality of functional elements can be autonomically configure a network because each functional element is provided with an ad hoc connection function.

Eighth Embodiment

Figure 47:
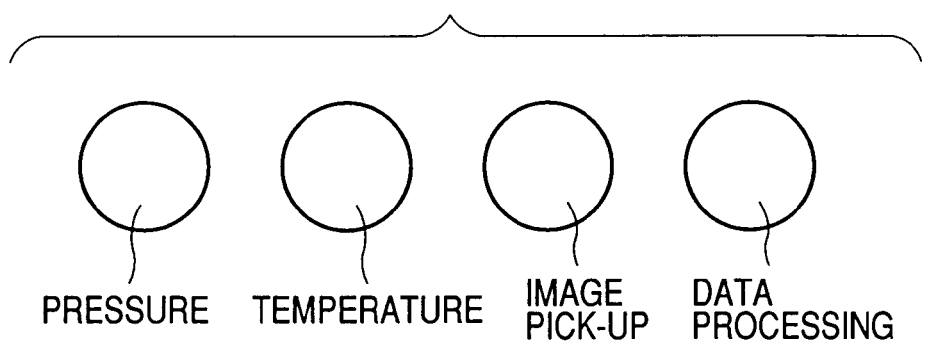
FIG. 47 is a diagram showing an example of the structure of a functional element group according to the invention.

A number of Motes each having a single different function may be disposed for multi-sensing of performing different types of sensing at the same time. FIG. 47 shows an example of data processing functional Motes for sensing and processing pressure, temperature and humidity. Mote is a functional element having a sensing and wireless communication function.

In this case, Mote having a function of sensing temperature, pressure and humidity at the same time is not used, but Mote with a temperature sensing function, Mote with a pressure sensing function and Mote with a humidity sensing function are used independently.

Since a function of each Mote is simple, the material and circuit structure become simple and such Mote can be manufactured easily and inexpensively. With communications by these Motes, a network system of high degree as a whole can therefore be configured.

Ninth Embodiment

Each functional element may have a different measurement range although it has the same measurement function. For example, each functional element have a different temperature range although it has the same temperature measurement function.

Figure 48:
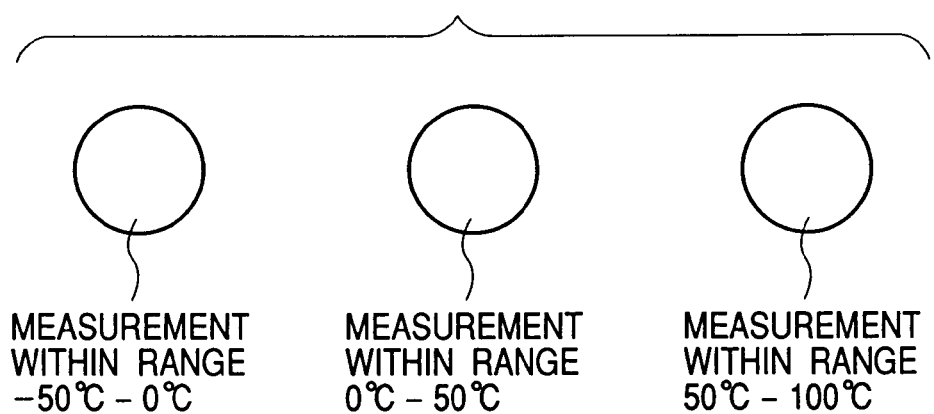
FIG. 48 is a diagram showing an example of the structure of a functional element group according to the invention.

As schematically shown in FIG. 48, a plurality of functional elements are used which have different temperature measurement ranges, from −50° C. to 0° C., from 0° C. to 50° C., from 50° C. to 100° C. and from 100° C. to 150° C.

By narrowing a measurement range, a temperature can be measured more correctly.

Figure 49:
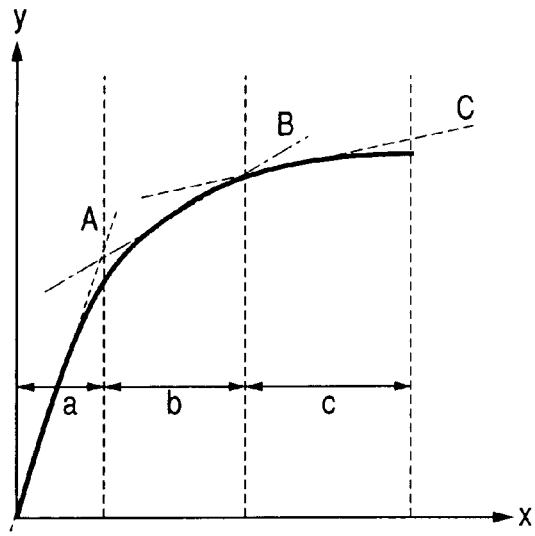
FIG. 49 is a graph showing an example of the characteristics of a functional element group according to the invention.

For example, there is a measurement object having the characteristics that an output y such as voltage changes with a measurement variable x such as temperature, as shown in FIG. 49. In this case, only one functional element does not sense the whole range of z. Ranges a, b and c can be approximated by straight lines A, B and C respectively. If straight line approximation is possible, the calculation operation is simplified and a data processing system becomes simple and can be configured easily.

For example, there are various types of thermocouples each having the optimum use conditions. For example, a chromel-alumel thermocouple (type K) has a linear relation between temperature and thermo-electromotive force and is most used in the industrial field. A use temperature range is −200° C. to 1100° C. and a highest use temperature is 1200° C.

An iron—constantan thermocouple (type J) has a high thermo-electromotive force next to the type E thermocouple and is used in the middle temperature range in the industrial field. A use temperature range is 0° C. to 600° C. and a highest use temperature is 750° C.

A copper—constantan thermocouple (type T) has a small electrical resistance and a stable thermo-electromotive force and is widely used for precise measurement in a low temperature range. A use temperature range is −200° C. to 300° C. and a highest use temperature is 350° C.

A chromel—constantan thermocouple (type E) has a highest thermo-electromotive force among those thermocouples defined in JIS. A use temperature range is −200° C. to 700° C. and a highest use temperature is 800° C.

A nicrosil—nisil thermocouple (type N) has a stable thermo-electromotive force in a wide temperature range from a low temperature to a high temperature. A use temperature range is—200° C. to 1200° C. and a highest use temperature is 1250° C.

A platinum 13% rhodium—platinum thermocouple (type R) is suitable for precise measurement at a high temperature in an inert gas atmosphere or an oxidizing atmosphere. Since it has a high precision and a small variation and less deterioration, it is used as a standard thermocouple. A use temperature range is 0° C. to 1400° C. and a highest use temperature is 1600° C.

A platinum 30% rhodium—platinum 6% rhodium thermocouple (type B) is used in highest temperature sensing range among the thermocouples defined in JIS. A use temperature range is 0° C. to 1500° C. and a highest use temperature is 1700° C.

A chrome—gold iron thermocouple (type AF) is most suitable for very low temperature measurement in a range of −269° C. to 30° C.

An iridium—iridium 50% rhodium is suitable for a vacuum atmosphere, an inert gas atmosphere or an oxidizing atmosphere. There is contamination because of vaporization of iridium. A use temperature range is 1100° C. to 2000° C. and a highest use temperature is 2100° C.

A tungsten 5% rhenium—tungsten 26% rhenium thermocouple is suitable for a reducing atmosphere, an inert gas atmosphere or an hydrogen gas atmosphere. The disadvantage is its fragility. A use temperature range is 0° C. to 2400° C. and a highest use temperature is 3000° C.

A nickel—nickel 18% molybdenum thermocouple can be used in a reducing atmosphere. It has a large thermo-electromotive force and measurement is easy.

A palladium platinum gold—gold palladium thermocouple has a high anti-abrasion. The thermo-electromotive force is almost the same as that of the type K thermocouple and measurement is easy. A use temperature range is 0° C. to 1100° C. and a highest use temperature is 1300° C.

By distributing Motes having different use temperature ranges, a total temperature measurement range can be broadened and various environments can be used.

Tenth Embodiment

In the ninth embodiment, each functional element has a limited measurement range. Instead, an operation environment may be limited.

For example, used are a number of functional elements, e.g., sensing Motes correctly operating in the different temperature ranges from −50° C. to 0° C., from 0° C. to 50° C., from 50° C. to 100° C., from 100° C. to 150° C. and from 150° C. to 200° C. If the operation temperature is different, sensing material, a communication circuit, antenna material and the optimum structure are also different. However, these can be optimized for each functional element so that an inexpensive element with a simple structure can be manufactured. Since a number of functional elements are used, the operation environment of the total system can be broadened from a low temperature to a high temperature.

Eleventh Embodiment

Figure 50A:
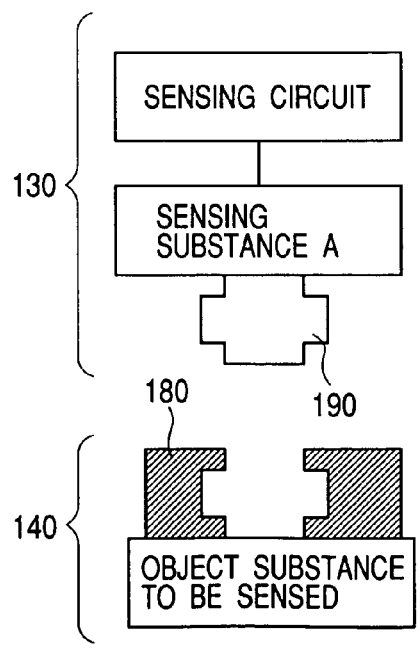
FIGS. 50A and 50B are diagrams showing an example of the structure of a functional element group according to the invention.
Figure 50B:
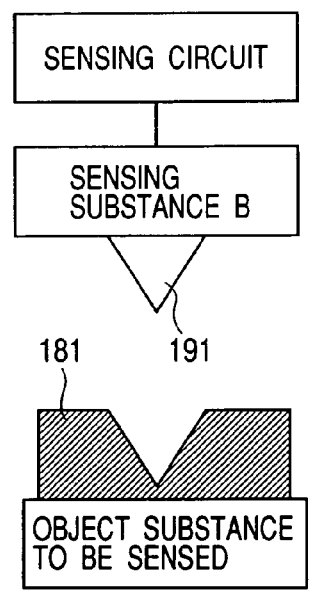

The same sensing function may be used for sensing different object substances. FIGS. 50A and 50B show the relation between an object to be sensed and sensing Motes. A sensing unit 140 has keys 180 and 181 as the object substances to be sensed. The keys 180 and 181 illustratively shown in FIGS. 50A and 50B correspond, for example, to the antigen-antibody reaction in organism.

Sensing Motes have keys 190 and 191 matching the shapes of the keys 180 and 181 to be sensed.

For example, even if the same protein is sensed, different sensing Motes may be used depending upon the kind of amino acid to be sensed. Although the same sensing function is used, object substances to be sensed are different. Since the same sensing function is used, the sensing mechanism is almost the same although the object substances to be sensed are different.

Twelfth Embodiment

Figure 51:
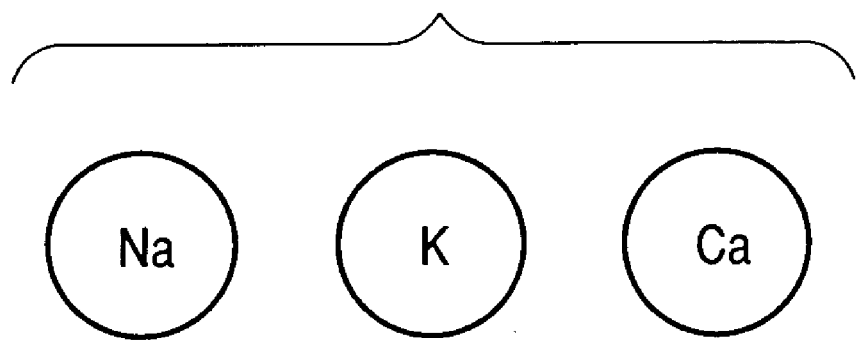
FIG. 51 is a diagram showing an example of the structure of a functional element group according to the invention.

As shown in FIG. 51, different ions may be sensed. For example, Mote for sensing potassium ions, Mote for sensing calcium ions and Mote for sensing sodium ions may be used.

Thirteenth Embodiment

In this embodiment, the numbers of various sensing Motes are housed in a sensing capsule.

Figure 52:
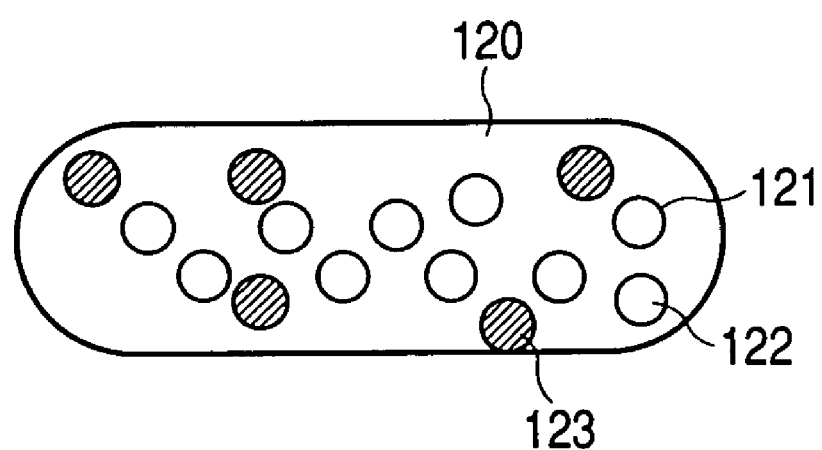
FIG. 52 is a diagram showing an example of the structure of a functional element group according to the invention.

For example, as shown in FIG. 52, a plurality of sensing Motes 121, 122 and 123 are accommodated in a capsule 120. If calcium ions and sodium ions are to be sensed mainly, the number of potassium ion sensing Motes is set to 10% of the total number of Motes in the capsule, the number of calcium ion sensing Motes is set to 50%, and the number of sodium ion sensing Motes is set to 40%.

If potassium ions are to be sensed mainly, the number of potassium ion sensing Motes is set to 80% of the total number of Motes in the capsule, the number of calcium ion sensing Motes is set to 10%, and the number of sodium ion sensing Motes is set to 10%.

By changing the number of Motes for sensing ions, an optimum ion sensing system can be configured.

Figure 53:
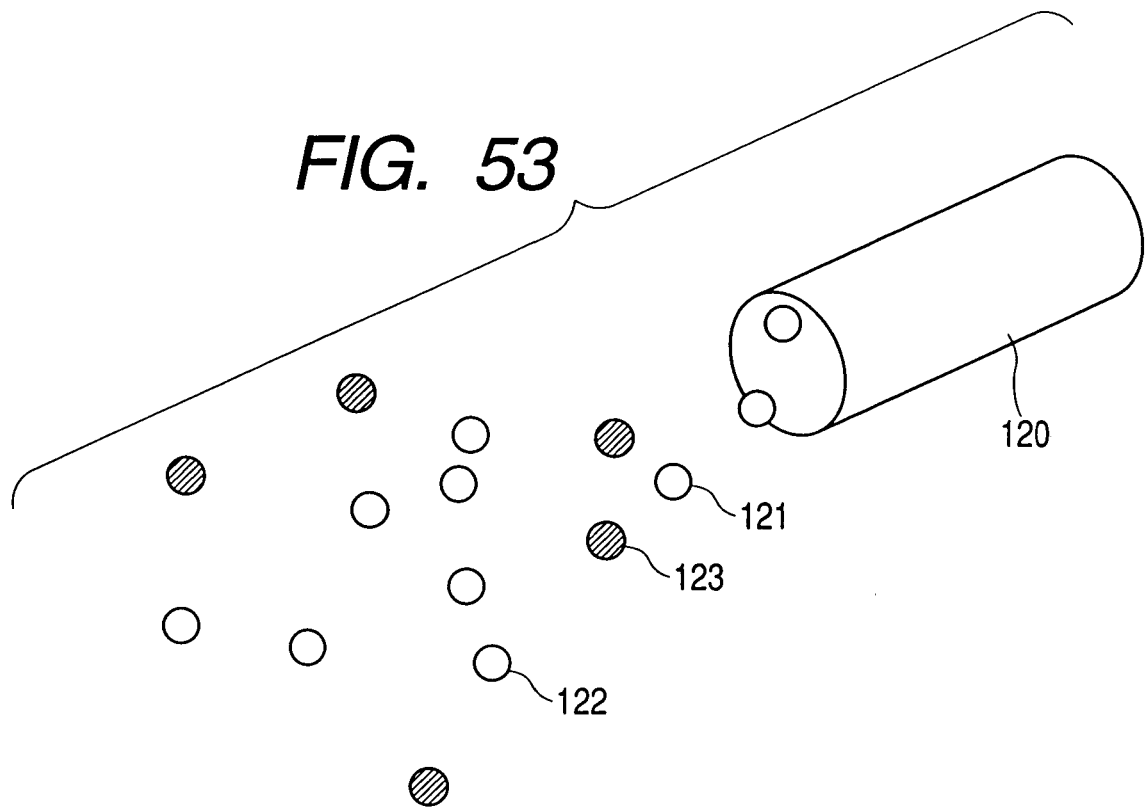
FIG. 53 is a diagram showing an example of the structure of a functional element group according to the invention.

As shown in FIG. 53, when the capsule enters a human body, it is dissolved so that each Mote is scattered in the human body to sense target ions.

Fourteenth Embodiment

A highly sophisticated sensing system can be realized by driving only necessary units to provide optimum sensing functions. The total power consumption can be reduced.

Figure 54:
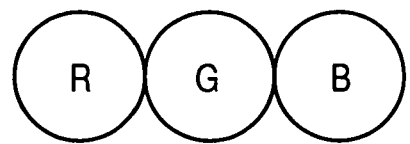
FIG. 54 is a diagram showing an example of application of a functional element of the invention to an imaging element.

The invention is applicable to imaging elements. FIG. 54 shows an example of sphere lens imaging elements constituted of the functional elements of the invention. Filters of R (red), G(green) and B(blue) are formed and an optical sensor such as a CCD and a CMOS is formed on the back of each sphere lens. Each functional element receives light in a predetermined wavelength band, and by using a number of functional elements, light in a broad wavelength band can be received. Since each functional element receives light in a predetermined wavelength band, the structure of the sensor is determined from the wavelength band.

According to the present invention, the fine functional element received control information from the base station communicates with another fine functional element by using the communication function to thereby provide one or more functions other the communication function and make the discrete fine functional elements make a cooperative work. It is therefore possible to provide a wireless communication apparatus and method for collectively managing a sensing operation at a plurality of different positions by using wearable apparatus or a sensing network.

According to the wireless communication apparatus and its driving method, a network is configured by using fine functional elements each having a wireless communication function and a special function such as a sensing function and the base station for controlling the fine functional elements. It is possible to collectively manage a sensing operation at a plurality of different positions by using wearable apparatus or a sensing network. According to the invention, among other things, it is possible to limit the function other than the wireless communication function of each fine functional element to a single function, resulting in a simple structure of the fine functional element. The fine functional elements perform as a whole a cooperative work so that a highly sophisticated sensing network can be configured.

What is claimed is:

1. A wireless communication apparatus comprising:
    a functional element group including a plurality of functional elements each performing a first function and a second function, wherein the first function is a wireless communication, the second function is measuring a physical value, and the functional element group is capable of measuring the physical value in a broader range rather than a range measured by each one of the functional elements and forms a network system arranged to perform a wireless communication among the functional elements through the first function; and
    a base station for collectively managing the plurality of functional elements and for wireless communication with each of the functional elements to control the functional element group or to receive data from the plurality of functional elements.

2. A wireless communication apparatus according to claim 1, wherein the functional elements are used in different environments.

3. A wireless communication apparatus according to claim 1, wherein the functional elements sense respectively different object substances through measuring the physical value by the second function.

4. A driving method for wireless communication apparatus comprising:
    a functional element group including a plurality of functional elements each performing a first function and a second function, wherein the first function is a wireless communication, the second function is measuring a physical value, and the functional element group is capable of measuring the physical value in a broader range rather than a range measured by each one of the functional elements and forms a network system arranged to perform a wireless communication among the functional elements through the first function; and
    a base station for collectively managing the plurality of functional elements, the method comprising steps of:
    controlling the functional element group based on the wireless communication between the base station and each of the functional elements; and
    receiving and transmitting a data between the base station and each of the functional elements.

* * * * *

UNITED STATES PATENT AND TRADEMARK OFFICE
CERTIFICATE OF CORRECTION

PATENT NO. : 7,075,455 B2  
APPLICATION NO. : 10/601748  
DATED : July 11, 2006  
INVENTOR(S) : Naoki Nishimura et al.

Page 1 of 1

It is certified that error appears in the above-identified patent and that said Letters Patent is hereby corrected as shown below:

Column 7, line 34, delete "4 a" and insert --4a--

Signed and Sealed this

Seventh Day of November, 2006

JON W. DUDAS  
*Director of the United States Patent and Trademark Office*